United States Patent
Igarashi et al.

(10) Patent No.: US 8,687,319 B2
(45) Date of Patent: Apr. 1, 2014

(54) MAGNETIC RECORDING APPARATUS WITH MAGNETIC RECORDING HEAD CAPABLE OF RECORDING INFORMATION ON A MAGNETIC RECORDING MEDIUM

(75) Inventors: Masukazu Igarashi, Kawagoe (JP); Masato Matsubara, Yokohama (JP); Keiichi Nagasaka, Isehara (JP); Masato Shiimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/404,036

(22) Filed: Feb. 24, 2012

(65) Prior Publication Data

US 2013/0070367 A1   Mar. 21, 2013

(30) Foreign Application Priority Data

Sep. 20, 2011   (JP) ................................ 2011-204843

(51) Int. Cl.
*G11B 5/127*   (2006.01)

(52) U.S. Cl.
USPC .................................................... 360/125.03

(58) Field of Classification Search
USPC ................. 360/125.03, 125.3, 324.1, 324.11, 360/324.12, 324.2
See application file for complete search history.

(56) References Cited

U.S. PATENT DOCUMENTS

| | | | | |
|---|---|---|---|---|
| 7,616,412 B2 * | 11/2009 | Zhu et al. | ..................... | 360/324.2 |
| 7,957,098 B2 * | 6/2011 | Yamada et al. | ............. | 360/125.3 |
| 7,965,474 B2 * | 6/2011 | Sato et al. | ................ | 360/324.12 |
| 8,208,219 B2 * | 6/2012 | Zhang et al. | ............. | 360/125.03 |
| 8,264,799 B2 * | 9/2012 | Akiyama et al. | ........... | 360/324.1 |
| 8,399,941 B2 * | 3/2013 | Apalkov et al. | ............... | 257/421 |
| 2008/0019040 A1 | 1/2008 | Zhu et al. | | |
| 2008/0268291 A1 | 10/2008 | Akiyama et al. | | |
| 2008/0304176 A1 | 12/2008 | Takagishi et al. | | |
| 2009/0052095 A1 | 2/2009 | Yamada et al. | | |
| 2009/0225465 A1 * | 9/2009 | Iwasaki et al. | .................. | 360/75 |
| 2010/0007996 A1 | 1/2010 | Iwasaki et al. | | |
| 2011/0043943 A1 | 2/2011 | Igarashi et al. | | |
| 2011/0216436 A1 | 9/2011 | Igarashi et al. | | |

FOREIGN PATENT DOCUMENTS

| | | |
|---|---|---|
| JP | 2008-277586 | 11/2008 |
| JP | 2008-305486 | 12/2008 |
| JP | 2009-70541 | 4/2009 |
| JP | 2010-3351 | 1/2010 |
| JP | 2010-510082 | 4/2010 |
| WO | WO 2010/053187 | 5/2010 |

OTHER PUBLICATIONS

Office Action issued in Japanese Patent Application No. 2012-280733 on Oct. 15, 2013.

* cited by examiner

*Primary Examiner* — Angel Castro
(74) *Attorney, Agent, or Firm* — Antonelli, Terry, Stout & Kraus, LLP.

(57) ABSTRACT

A spin torque oscillator for microwave assisted recording includes a perpendicular free layer having a magnetic anisotropy axis in a direction perpendicular to a film surface, and an in-plane free layer composed of a magnetic film effectively having a magnetization easy plane on a film surface. When electric currents flows from the in-plane free layer side to the perpendicular free layer side, both free layers exchange spin information and thereby rotate their respective magnetizations almost antiparallel to each other and along a boundary surface with high-speed. Preferably, the perpendicular free layer is thinner than the in-plane free layer. It is also preferable that a magnetic anisotropy field of the perpendicular free layer attributable to materials should balance, in reverse directions, with an effective demagnetizing field in the perpendicular direction. Furthermore, the perpendicular free layer is preferably placed on the main pole side.

12 Claims, 25 Drawing Sheets

$B_{sp}$ = 1.5(T)
$t_p$ = 3.0(nm)
$H_{dp\text{-}eff}$ = 1.09(MA/m)

| | ① | ② | ③ |
|---|---|---|---|
| $H_{kp}$ (kA/m) | 1120 | 960 | 480 |
| $t_p, B_{sp}, \alpha_p$ | 3.0nm, 1.5 T, 0.07 | | 1.5nm, 0.75 T, 0.03 |
| Crosssection | 40nm × 40nm | | 15nm × 15nm |
| $t_h, J$ | 12nm, 0.4 TA/m² | | 15nm, 0.05 TA/m² |
| $B_{sh}, \alpha_h, H_{ext}$ | 2.4 T, 0.01, 600 kA/m | | |

MAGNETIC RECORDING APPARATUS WITH MAGNETIC RECORDING HEAD CAPABLE OF RECORDING INFORMATION ON A MAGNETIC RECORDING MEDIUM

CLAIM OF PRIORITY

The present application claims priority from Japanese patent application JP2011-204843 filed on Sep. 20, 2011, the content of which is hereby incorporated by reference into this application.

CROSS REFERENCE TO RELATED APPLICATION

U.S. patent application Ser. No. 13/287,292 is a co-pending application of this application, the content of which is incorporated herein by cross-reference.

BACKGROUND OF THE INVENTION

1. Field of the Invention

The present invention relates to a magnetic recording head capable of recording information on a magnetic recording medium by applying a high-frequency magnetic field to the medium to drive magnetic resonance and inducing magnetization switching of the recording medium, and a magnetic recording apparatus incorporating the magnetic recording head.

2. Description of the Related Art

With recent improvement in performance of computers, and speed and capacity of networks, amounts of information distributed in the form of digital data have been dramatically increasing. In this connection, a storage device capable of inputting and outputting large amounts of information at a high speed is needed to efficiently receive/transmit and extract such large amounts of information. With an increase in the high areal recording density, magnetic disks have become more prominently susceptible to a problem that signals which are once recorded gradually decrease due to thermal fluctuation. Since a magnetic recording medium is an aggregate of magnetic microcrystals, a decrease in the volume of each of the microcrystals causes the above problem. It is believed that often-used thermal fluctuation indicators $K\beta$ ($=K_u V/kT$; $K_u$: magnetic anisotropy, V: particle volume, T: absolute temperature, and k: Boltzmann constant) need to be 70 or higher to achieve adequate thermal fluctuation resistance stability. Given that Ku and T (material, environment) are fixed, the smaller V a microcrystal has, the more likely the magnetization is switched due to the thermal fluctuation. As the volume of a recording film occupied by 1 bit decreases with an increase in the high areal recording density, V should be reduced and thus the thermal fluctuation cannot be ignored. If $K_u$ is increased to control the thermal fluctuation, a switching field needed for magnetic recording will exceed a writemagnetic field that can be generated by a recording head, which will result in disabled recording.

In order to avoid the problem, Zhu and others of CMU disclose microwave assisted magnetic recording (MAMR) technology in Patent Document 1. As shown in FIG. 1A, MAMR is recording in a way that a microwave field from a spin torque oscillator (STO) arranged adjacent to a main pole, in addition to a write field from the main pole of a perpendicular recording head, is applied to a magnetic recording medium 7 with high magnetic anisotropy and turns a recording target area into a magnetic resonance state to reduce the switching field. This enables recording onto a microwave irradiation area of a magnetic recording medium capable of high areal recording density exceeding 1 Tbit/in$^2$ on which a conventional recording head has difficulty in recording due to an insufficient writemagnetic field. The STO generates microwaves (high-frequency magnetic fields) by conveying spin torques from a reference layer 31 to an adjacent field generation layer (FGL) 32 via Cu, and rapidly rotating magnetization of the FGL 32, which is an in-plane free layer, in a plane.

As MAMR utilizes the magnetic resonance phenomenon, an effective microwave field component is a polarized field component in anti-clockwise direction, which is a same rotating direction as precession of the recording medium magnetization. On the other hand, as shown in FIG. 1B, microwave fields from the FGL 32 which is a microwave field source of STO is an ellipsoidally polarized field whose rotating directions are dependent on a magnetization rotating direction of the FGL, and rotate in inverse directions before and behind the FGL 32, when viewed in a direction of head running. Thus, an anti-clockwise polarized field which is effective for MAMR is created only on one of the sides before and behind the FGL 32. Thus, a rotating direction of magnetization of the FGL 32 needs to be switched every time polarity of a main pole is switched. A realistic method for such switching is to switch magnetization of a reference layer, which acts as a spin torque source, according to a main pole field $H_{ext}$ while keeping STO drive currents constant as disclosed in Patent Document 2 and Patent Document 3 (See FIG. 2A and FIG. 2B).

In this case, since it is considered that spin torques necessary for driving the FGL cannot be obtained while magnetization of the reference layer is switching, high-speed magnetization switching of the reference layer is needed. Patent Document 2 discloses a technology for reducing magnetic coercive force of a reference layer of the STO disclosed in Patent Document 1 and switching reference layer magnetization by a main pole field, and a technology for increasing a switching speed by placing a magnetic body with high magnetic flux density adjacent to a reference layer. Patent Document 2 also discloses a technology for substantially making a part of a main pole or an auxiliary magnetic pole serve as a reference layer. A main pole is provided with a lip portion, a high-frequency magnetic field generator is arranged with a spin scattering layer interposed in between, and an electric current is supplied so that spin torques act in a direction to suppress an influence of a magnetic field of the main pole on the FGL. This configuration allows a magnetic field flowing into the radio-frequency generator from the main pole to enter perpendicular to a film surface. As the main pole is used as a spin source, a high-frequency magnetic field generator driving current which can achieve generation of a maximum high-frequency magnetic field independent of polarity of the main pole can be set according to a desired frequency.

In addition, Patent Document 4 and Patent Document 5 disclose a technology in which a pair of equivalent FGLs are configured to rapidly rotate their magnetization while keeping the magnetization antiparallel to each other, and a one-way high-frequency magnetic field which is generated from end faces of the FGLs and parallel to a recording medium face is applied to a medium for efficiently switching medium magnetization irrespective of the FGLs rotating direction.

[Patent Document 1] US 2008/0019040 A1
[Patent Document 2] JP 2009-070541 A
[Patent Document 3] WO 2009/133786 A1
[Patent Document 4] JP 2008-277586 A
[Patent Document 5] JP 2008-305486A

SUMMARY OF THE INVENTION

In Microwave Assisted Magnetic Recording (MAMR) having areal recording density higher than 1 T bit per square inch, information is recorded in a way that an area of a magnetic recording medium of the nanometer order to which a write field from a main pole is applied is irradiated with a strong high-frequency magnetic field, and thereby is locally turned in a magnetic resonance state to reduce a switching field. As MAMR is based on the principle of magnetic resonance, only radio-frequency polarized field components which match a rotating direction of precession of magnetization of a recording area are effective for magnetization switching of the medium. Therefore, in order to obtain a high-frequency magnetic field with high switching efficiency, a rotating direction of magnetization of an FGL needs to be switched when polarity of a main pole is switched. If the rotating direction of magnetization of the FGL is not switched every time polarity of the main pole is switched, a switching position of medium magnetization will shift before and behind the FGL, and linear areal recording density cannot be improved.

In Patent Document 1, it is believed that stable spin torques are supplied to the FGL because a multilayer with high magnetic anisotropy (and relatively low saturation flux density) such as (Co/Pd)n, (Co/Pt)n and the like are used for a reference layer of STO. However, since reference layer magnetization is not switched along with switching of polarity of the main pole, STO drive currents need to be switched to switch a rotating direction of FGL magnetization. In this case, the following problems need to be solved, which thus makes realization extremely difficult: a) efficiency of spin torques varies depending on whether a current is positive or negative, b) external magnetic fields to be applied to the FGL are not equal, c) a rising angle of FGL magnetization differs, and d) STO drive currents need to be synchronized with magnetic fields of a main pole In Patent Document 2, a multilayer, such as (Co/Pd)n, (Co/Pt)n and the like, whose magnetic coercive force is made lower than a magnetic field from the main pole is used for a reference layer which is a source of spin torques, magnetization of the reference layer is switched synchronously with polarity of the main pole while keeping STO drive currents constant, and then a rotating direction of magnetization of the FGL is switched. The multilayer such as (Co/Pd)n, (Co/Pt)n and the like whose magnetic coercive force is reduced tends to have further reduced saturation flux density $B_s$. Thus, even lamination of high Bs materials cannot achieve sufficient magnetization switching speed of the reference layer. In addition, there is another problem that due to low magnetic coercive force of the reference layer, when an attempt is made to supply large spin torques to the FGL by intensifying electric currents, counteraction thereof destabilizes the reference layer magnetization. Furthermore, there is also a problem that as the multilayer has a high damping factor α of 0.1 to 0.3 for magnetization motion, spins are consumed by the spin pumping action, and consequently, application of more electric currents is necessary to obtain high-frequency magnetic fields of same frequency.

In Patent Document 3, by making the lip portion provided in the main pole serve as the reference layer, magnetization of the reference layer is switched synchronously with polarity of the main pole while keeping the STO drive current constant, and then the rotating direction of magnetization of the FGL is switched. It is believed that the magnetization switching speed is sufficiently fast because a part of the main pole or the auxiliary magnetic pole is substantially made to serve as the reference layer. However, magnetization of the reference layer easily fluctuates due to effect of magnetization state of the main pole or counteraction of spin torques from the FGL, which makes it difficult to apply a large STO drive current and increase an oscillatory frequency. In these Patent Documents 2, 3, when polarity of the main pole is switched, magnetization of a magnetic body which acts as a source of spin torques is switched synchronously with the polarity of the main pole. Therefore, when the polarity of the main pole is switched, a total value of switching time of the main pole polarity, switching time of the reference layer, and stabilizing time of the FGL is necessary before stable oscillation state is reached. Thus, there is a concern that sufficient time to write to a recording medium cannot be obtained.

In the Patent Documents 4, 5, an in-plane linear oscillating magnetic field is generated at the center of a head, and there is no difference in recording characteristics depending on a rotating direction of the FGL. However, at ends of a track, as effects of phase-lag high-frequency magnetic fields from ends of the FGL are not easy to avoid, and effects of the polarized field components become conspicuous, higher track density changes the recording characteristics depending on the rotating direction of the FGL. Thus, similar to Patent Documents 2, 3, magnetization of the reference layer needs to be switched synchronously with polarity of the main pole. In addition, the technology disclosed in Patent Documents 4, 5 has a problem that, due to the principle thereof, as reference layer magnetization equivalent to FGL magnetization needs to be rapidly spun, a necessary amount of electric currents is doubled.

In a HDD, with increasing surface areal recording density, bit length in a track direction is shortened. In magnetic recording exceeding 1 Tbit/in$^2$, it is expected that the bit length in the track direction will be 10 nm or lower. In this case, if a head-medium spacing of 20 m/2, which is used as a standard in the current HDD, is applied, recording is performed at $^{10}/_{20}$=0.5 n second or less per bit. In this case, information transfer rate is 2 Gbit/s. For the technologies in Patent Documents 2 to 5, switching of the reference layer magnetization synchronous with the polarity of the main pole is required. Thus, if switching time of the reference layer is even 0.2 second or less, it may be possible that the FGL magnetization to be conveyed by spin torques from the reference layer during the switching time will be no longer in stable oscillation state. Since it is considered that recovery takes equivalent amount of time, it is difficult to realize the information transfer rate of 2 Gbit/s or higher.

An object of the present invention is to provide a magnetic recording head and a magnetic recording apparatus which are suitable for ultra-high density magnetic recording, and which are highly reliable and consequently lower cost by reducing time from start of magnetization switching of a main pole until reaching of stable oscillation state to 0.3 second or less.

A magnetic recording head of the present invention is a magnetic recording head including a main pole and a spin torque oscillator arranged in the vicinity of the main pole, and configured to record information by switching magnetization of a magnetic recording medium with a switching field generated by the main pole and a high-frequency magnetic field generated by the spin torque oscillator. The spin torque oscillator includes a perpendicular free layer formed of a magnetic film having a magnetic anisotropy axis in a direction perpendicular to a film surface, and an in-plane free layer effectively having a magnetization easy plane on a film surface. An electric current flows from an in-plane free layer side to a perpendicular free layer side in the spin torque oscillator. It is preferable that the perpendicular free layer have thinner film thickness than the in-plane free layer, and that a magnetic anisotropy field of the perpendicular free layer attributable to a material and an effective demagnetizing field in a direction perpendicular to a film surface of the perpendicular free layer nearly balance in reverse directions. In addition, the perpendicular free layer is preferably placed between the main pole and the in-plane free layer.

In the spin torque oscillator of the present invention, magnetization of the perpendicular free layer remains almost within a magnetization rotating plane, and hence scarcely changes an angle with the magnetic anisotropy axis scarcely before and after switching of polarity of the main pole. Since magnetization of the in-plane free layer also remains within the plane of rotation, writing to a recording medium is enabled immediately after switching of polarity of the main pole. Use of the spin torque oscillator of the present invention allows the rotation state of an applied magnetic field to be promptly switched. Consequently, magnetic recording using the microwave assisted recording with the areal recording density exceeding 1 T bit per square inch can achieve an information transfer rate of over 2 Gbit/s.

Any problem, configuration, and effect other than those described above will become apparent through the following description of the preferred embodiment.

DESCRIPTION OF THE PREFERRED EMBODIMENTS

Figure 1A:
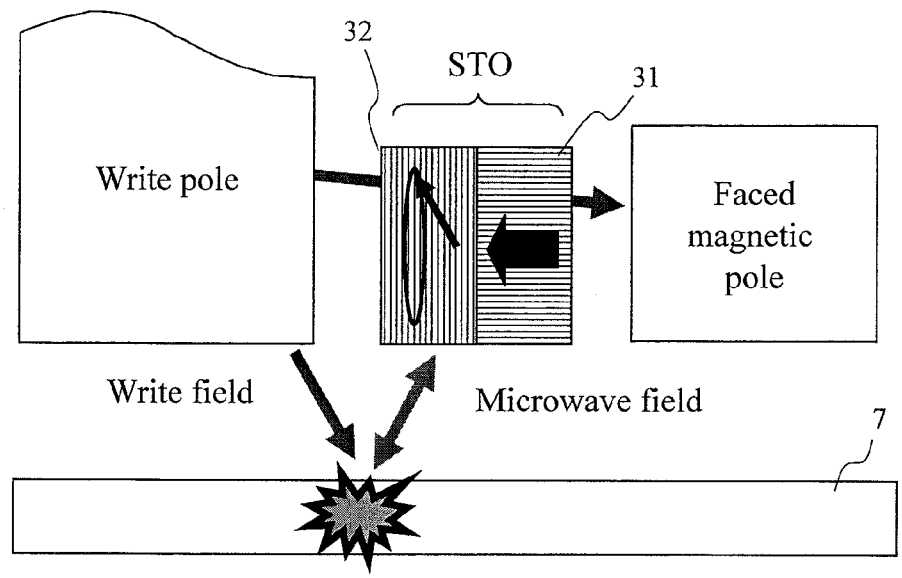
FIG. 1A is a view showing the principle of MAMR.
Figure 1B:
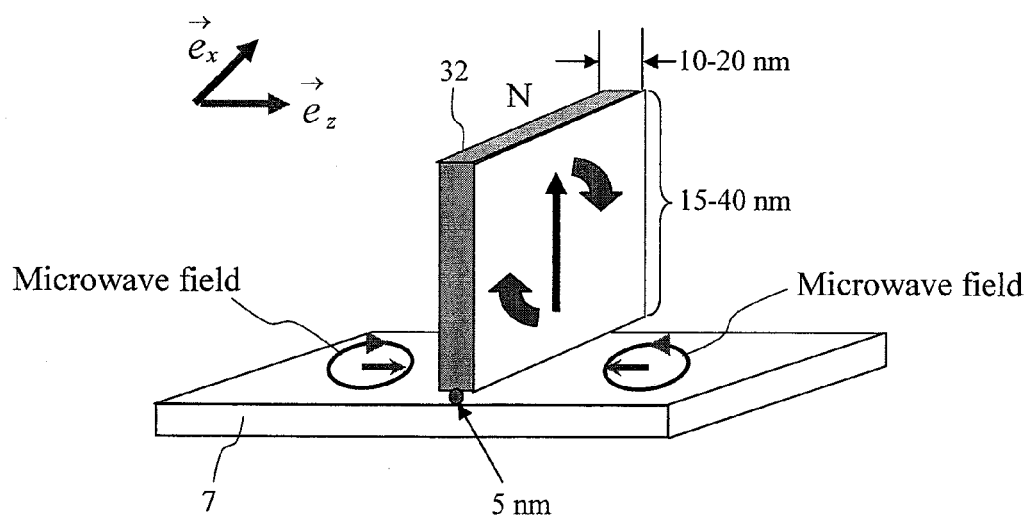
FIG. 1B is a view showing a magnetic field to be created from an FGL.
Figure 2A:
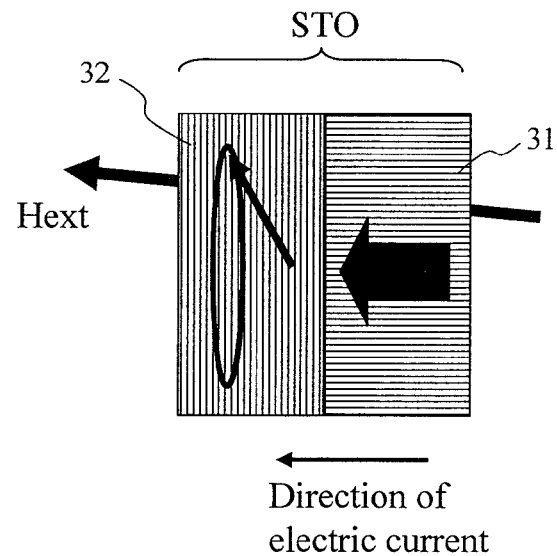
FIG. 2A is a view showing a relationship of an external magnetic field in a conventional STO and a direction of an STO drive current.
Figure 2B:
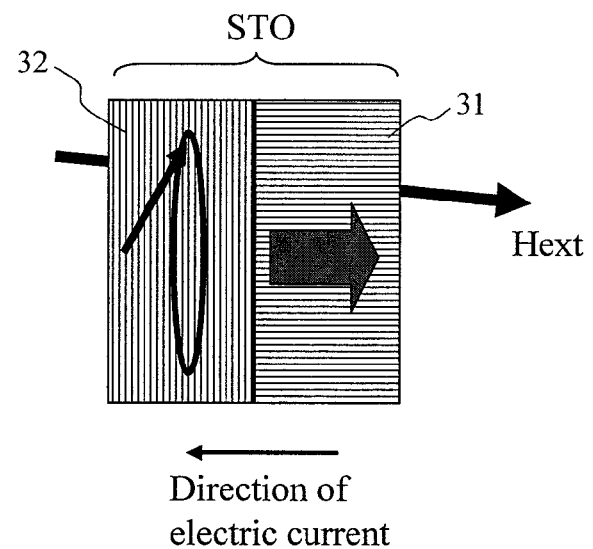
FIG. 2B is a view showing a relationship of an external magnetic field in a conventional STO and a direction of an STO drive current.
Figure 3:
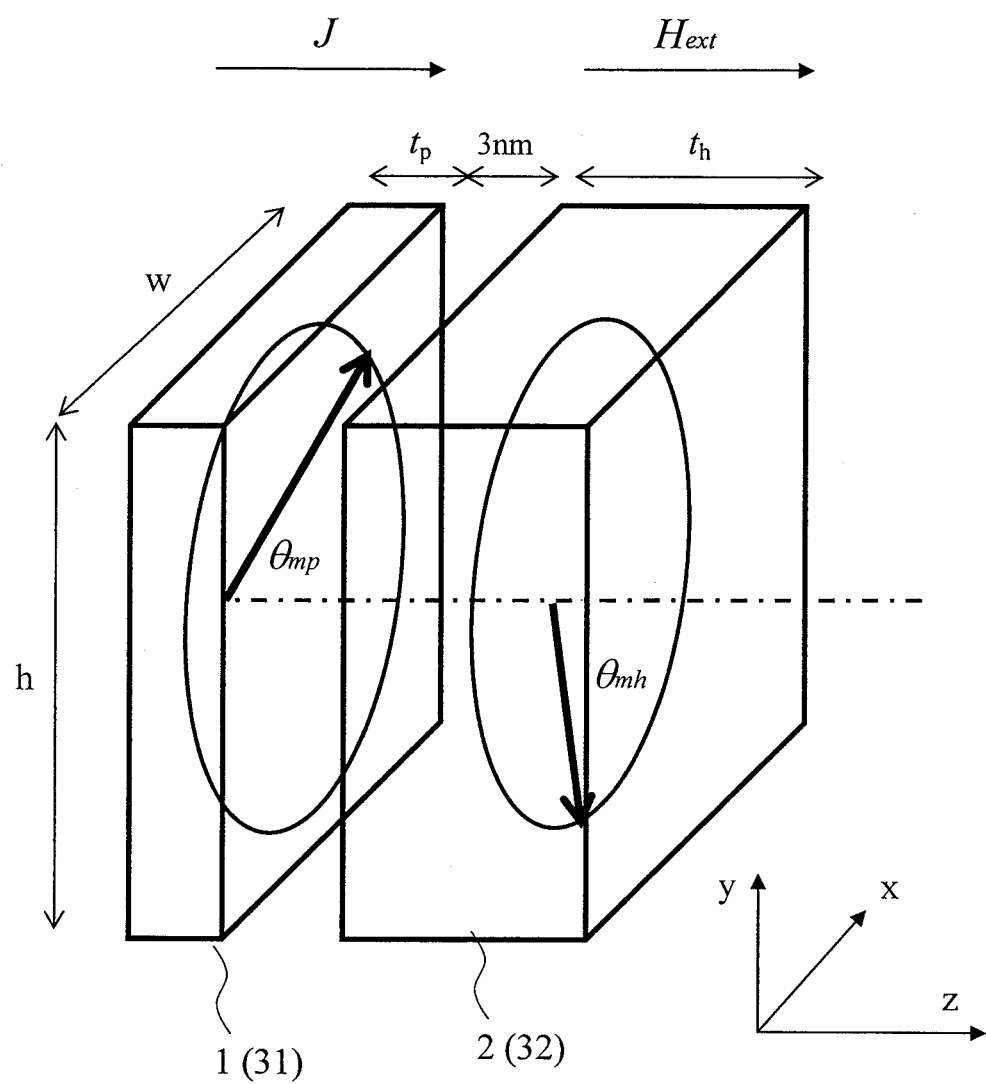
FIG. 3 is a view showing a calculation model for an STO.

When STO drive currents are applied in a direction reverse to a conventional direction during an oscillation test of a prototype head of an STO for MAMR, behavior leading to an idea that polarity of a main pole can be switched at a high speed was observed. In order to analyze new oscillation state that has never been considered before, magnetization switching behavior was analyzed through computer simulation based on the following LLG (Landau Lifschitz Gilbert) equation (1), on the assumption that reference layer magnetization moves, being dragged by FGL magnetization (called a perpendicular free layer). Here, a reference layer or a perpendicular free layer is composed of a magnetic film having a magnetic anisotropy axis in a direction perpendicular to a film surface, and an FGL or an in-plane free layer is composed of a magnetic film effectively having a magnetization easy plane on the film surface. FIG. 3 is a view showing a calculation model for the STO.

$$\frac{dm_h}{dt} = -\gamma m_h \times H_{h\text{-}eff} + \alpha_h m_h \times \frac{dm_h}{dt} + \gamma \beta_h I \cdot m_h \times (m_h \times m_p) \quad (1)$$

$$\frac{dm_p}{dt} = -\gamma m_p \times H_{p\text{-}eff} + \alpha_p m_p \times \frac{dm_p}{dt} + \gamma \beta_p I \cdot m_p \times (m_h \times m_p),$$

$$\beta_h = \frac{2\mu_B}{\gamma e V_h M_{sh}} g, \beta_p = \frac{2\mu_B}{\gamma e V_p M_{sp}} g,$$

$$g = \left[ -4 + \frac{(1+P)^3(3+m_h \cdot m_p)}{4P^{3/2}} \right]^{-1}$$

Where $\gamma$, I, $\mu_B$, e, and P are respectively a gyro magnetic constant, current in the direction perpendicular to the film surface (J is current density), a Bohr magneton, an elementary charge, and polarizability. $M_h$, $H_{h\text{-}eff}$, $\alpha h$, $V_h$, and $M_{sh}$ are respectively, a unit vector of the in-plane free layer 2 (or the FGL 32), an effective field, a damping factor, volume, and saturation magnetization. In addition, $m_p$, $H_{p\text{-}eff}$, $\alpha_p$, $V_p$, $M_{sp}$ are respectively a unit vector of the perpendicular free layer 1 (or the reference layer 31), an effective field, a damping factor, volume, and saturation magnetization. The effective field $H_{h\text{-}eff}$ of the in-plane free layer consists of a sum of 4 components of a magnetic anisotropy field Hah (=$H_{kh} \times \cos \theta m_h$, where $\theta m_h$ is an angle formed by the in-plane free layer magnetization and axis z), a magneto static field $H_{sh}$, a demagnetizing field $H_{dh}$, and an external magnetic field $H_{ext}$. In addition, an effective field $H_{p\text{-}eff}$ of the perpendicular free layer 1 consists of a sum of 4 components of a magnetic anisotropy field Hap (=$H_{kp} \times \cos \theta mp$, where $\theta mp$ is an angle formed by the perpendicular free layer magnetization and axis z), a magneto static field $H_{sp}$, a demagnetizing field $H_{dp}$, and the external magnetic field $H_{ext}$. For the magneto static fields, $H_{sh}$, $H_{sp}$, as shown in a spatial arrangement of FIG. 3, effects of mutual magnetization when the in-plane free layer 2 and the perpendicular free layer 1 wee parallel and spaced by 3 nm was calculated. A gap between the in-plane free layer 2 and the perpendicular free layer 1 is for a non-magnetic spin transfer layer such as Cu which conveys spin information by electric currents without conveying exchange coupling Layer thickness is not limited to 3 nm.

Figure 4A:
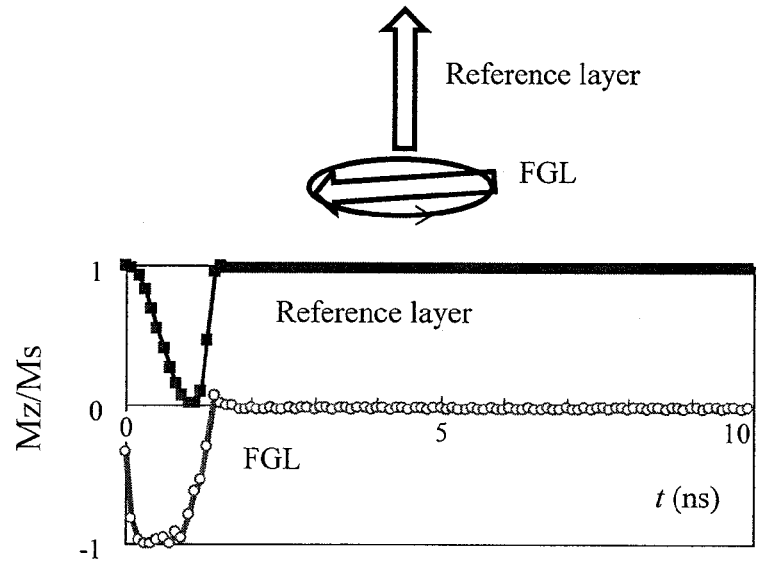
FIG. 4A is a view showing a temporal change in a reference layer magnetization z component and an FGL magnetization z component in the conventional STO.
Figure 4B:
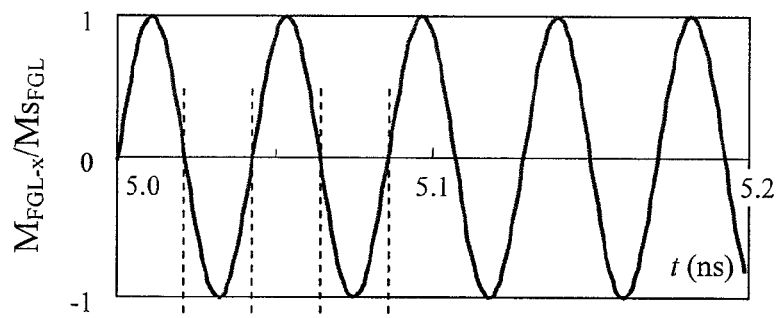
FIG. 4B is a view showing a temporal change in an FGL magnetization x component in the conventional STO.
Figure 4C:
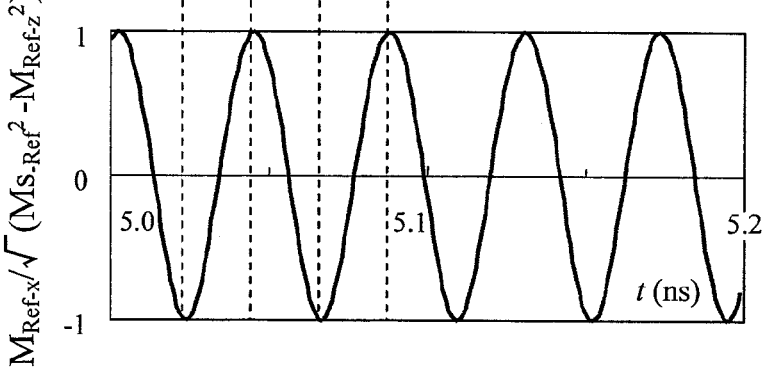
FIG. 4C is a view showing a temporal change in a reference layer magnetization x component in the conventional STO.
Figure 4D:
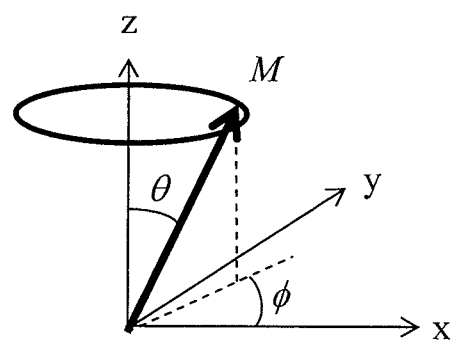
FIG. 4D is a view showing rotating directions of reference layer magnetization and FGL magnetization in the conventional STO.
Figure 4D:
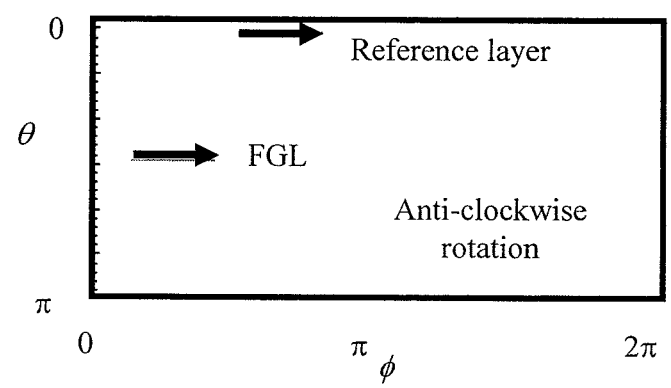

First, results of calculation of oscillation state for a conventional STO are shown. For a calculation model were assumed a magnetic body as the reference layer 31 which has width of 40 nm×height of 40 nm×thickness of 10 nm, saturation flux density of 1.5 T, and perpendicular magnetic anisotropy $H_{kp}$ of 960 kA/m (12 KOe), and a soft magnet as the FGL 32 which has width of 40 nm×height of 40 nm and height of 12 nm and saturation flux density of 2.3 T. FIG. 4A to FIG. 4B are views showing temporal changes of the reference layer magnetization and the FGL magnetization when electric currents were applied from the reference layer 31 side to the FGL 32 side, as with the conventional STO. The external magnetic field $H_{ext}$ was applied to a +z direction with intensity of 480 kA/m, and magnitude of the STO drive current was 0.1 TA/m². In addition, current density values shown in the specification varies with different conditions, they are not limited to the current density values described in the Advantageous Effect of the Invention. FIGS. 4A, 4B, and 4C show values obtained by normalizing the z component of the reference layer magnetization $M_{Fixed}$ and the FGL magnetization $M_{FGL}$, the x component $M_{FGL\text{-}x}$ of the FGL magnetization, and the x component $M_{Fixed\text{-}x}$ of the reference layer magnetization, respectively, with saturation magnetization ($M_{sFGL}$, $M_{sFixed}$) of respective magnetic layers. In addition, FIG. 4D shows rotating direction of the reference layer magnetization and the FGL magnetization.

In FIG. 4A, as the z components of the magnetization did not change after 1.3 n seconds till 10 n seconds in both of the reference layer magnetization and the FGL magnetization, it can be seen that a certain angle with the +z axis direction (field application direction) is maintained. In addition, the reason why the magnetization once dropped and then rose in FIG. 4A is that initial conditions used in the simulation were in relatively high energy state and there was a need to release the energy at the beginning.

As from FIG. 4B, the x component of the FGL magnetization orthogonal to the axis z regularly oscillates with sine waves, it is understood that the FGL magnetization tilts about 90 degrees from the z axis (x-y plane) and is turning with the z direction as an axis. The number of revolutions (oscillations) is about 23 GHz as it makes 4.6 turns in 0.2 n second. Since MAMR utilizes high-frequency magnetic fields to be generated by high-speed switching of magnetization appearing on the FGL side, it is preferable that the FGL magnetization rotates within the x-y plane whenever possible. The larger the electric currents applied from the reference layer side to the FGL side of the STO are, the larger the angle from the +z axis direction and the number of magnetization revolutions of the FGL magnetization are. Therefore, in the conventional STO, there is a possibility that an electric current value with which the number of revolutions (oscillations) optimal for magnetization switching of a recording medium is obtained and an electric current value when the FGL magnetization rotates within the x-y plane do not necessarily match.

Then, with reference to FIG. 4C, the reference layer magnetization is also regularly oscillating with sine waves, similar to the FGL magnetization. It is understood from this that the reference layer magnetization tilts from the z axis and is rotating, although it is negligible. Although it is believed that the reference layer magnetization oscillates due to the FGL magnetization, the reference layer magnetization is not sufficiently fixed and stable in-plane revolutions of the FGL magnetization cannot be achieved if the oscillation increases.

A conventional type of oscillation mode in which magnetization of the reference layer 31 is almost oriented to the +z axis direction, and magnetization of the FGL 32 is rotating in a plane is hereinafter referred to as T-mode oscillation. In the T-mode oscillation, when electric currents are applied from the reference layer 31 side to the FGL 32 side, electrons (spin) trying to make the FGL magnetization antiparallel to the reference layer magnetization are reflected from the reference layer, and the FGL magnetization is rotated under the spin torque action. In order to achieve stable oscillation (magnetization rotation) state, the reference layer magnetization needs to be fixed sufficiently. In the conventional STO utilizing the T-mode oscillation, when an external magnetic field is weak, when perpendicular magnetic anisotropy is weak, or when thickness of a reference layer is thin, oscillation tends to be disturbed. It is believed that this is because the reference layer is not fixed sufficiently.

FIG. 4D is a view showing how magnetization moves in minimal time such as about 0.01 n second, to examine a rotating direction of each magnetization. Here, θ is an angle of each magnetization from the +z direction, and φ is an angle from a +x direction when each magnetization is projected onto the x-y plane. As both of the FGL magnetization and the reference layer magnetization move in a direction in which φ increases, it can be seen that they rotate clockwise toward the +z direction to which the external magnetic field is applied. In MAMR, the rotating direction is a preferred direction which generates radio-frequency polarized fields with higher magnetization switching efficiency of a recoding medium when a magnetic field from a main pole is used as an applied field to an STO which is arranged in the proximity of the main pole.

Figure 5A:
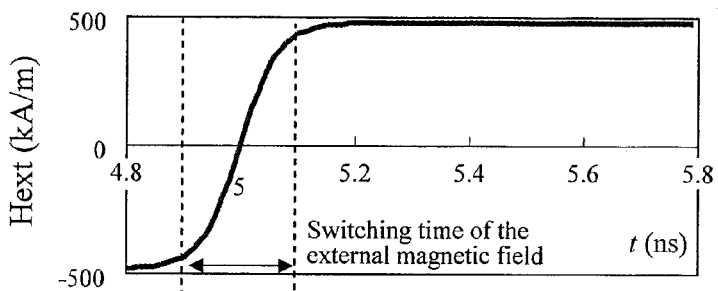
FIG. 5A is a view showing a temporal change in switching of an external magnetic field used in calculations.
Figure 5B:
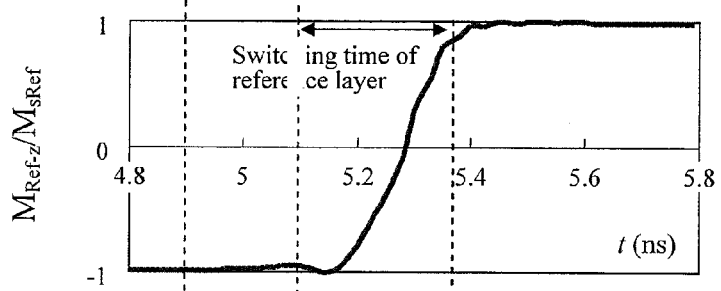
FIG. 5B is a view showing a temporal change in the reference layer magnetization z component in the conventional STO.
Figure 5C:
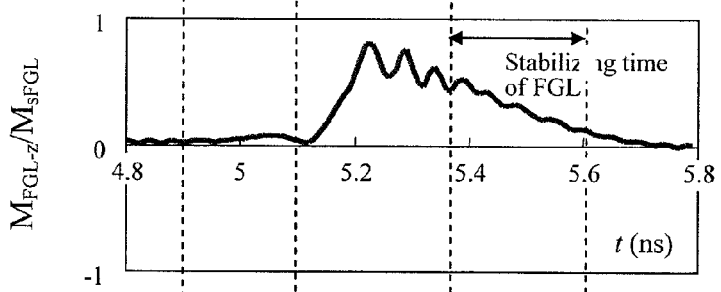
FIG. 5C is a view showing a temporal change in the FGL magnetization z component in the conventional STO.
Figure 5D:
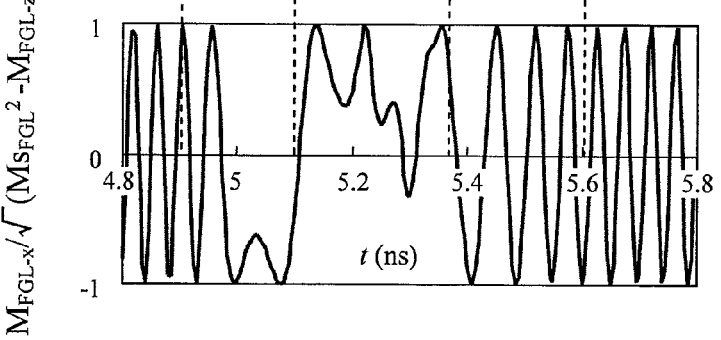
FIG. 5D is a view showing a temporal change in the FGL magnetization x component in the conventional STO.

FIGS. 5A to 5D are views showing temporal changes in the reference layer magnetization and the FGL magnetization during switching of the external magnetic field in the T-mode (conventional STO). FIG. 5A shows a temporal profile of the external magnetic field whose polarity is switched from the minus z direction to the plus z direction at t=5 n seconds, and in which a hyperbola secant function (tan h) by which time from start of switching till completion of the switching is about 0.2 n second is used. FIG. 5B shows the magnetization switching (z component) of the reference layer, FIG. 5C shows the switching (z component) of the FGL magnetization, and FIG. 5D shows the rotation (x component) of the FGL magnetization with the z direction as an axis. The external magnetic field $H_{ext}$ was 480 kA/m, the perpendicular magnetic anisotropy $H_{kp}$ of the reference layer was 960 kA/m, and magnitude of the STO drive current was 0.1 TA/m².

According to FIGS. 5A and 5B, switching of the reference layer magnetization takes 0.25 n second to complete as it starts to rotate after switching of the external magnetic field completes. According to FIGS. 5B and 5C, the FGL magnetization widely deviates from a stable oscillation position ($M_{vz}=0$) where an output field is maximum in early phase of the switching of the reference layer magnetization. It is believed that as the STO drive currents were continuously applied even during the switching of the reference layer magnetization, spin torques from the reference layer acted to keep the FGL magnetization away from the stable oscillation position. It further took about 0.2 n second for the FGL magnetization to return to the stable oscillation position. Therefore, it took about 0.7 n seconds from when the switching of the external magnetic field started till when the stable oscillation state was reached. According to FIG. 5D, it is understood that the FGL was in irregular oscillation state during this time, thus making adequate assisted recoding impossible.

Figure 6A:
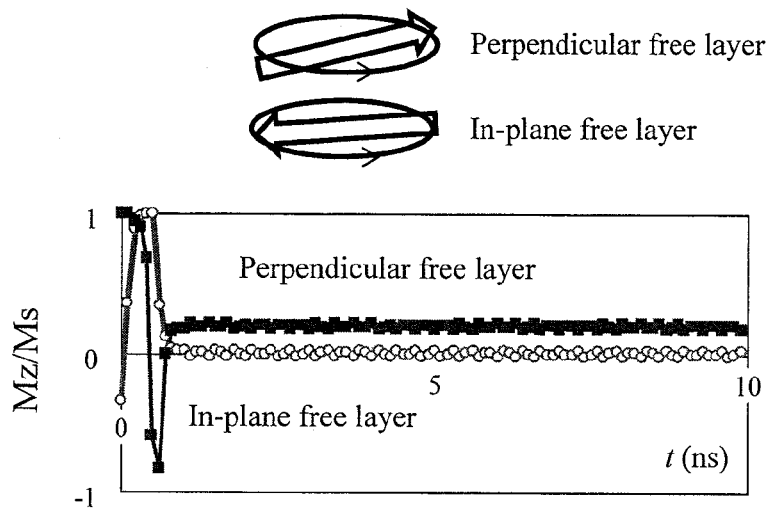
FIG. 6A is a view showing a temporal change in perpendicular free layer magnetization z component and an in-plane free layer magnetization z component during switching of an external magnetic field of an STO of the present invention.
Figure 6B:
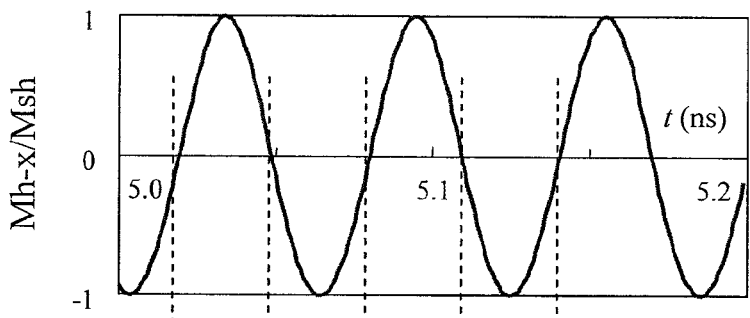
FIG. 6B is a view showing a temporal change in an in-plane free layer magnetization x component of the STO of the preset invention.
Figure 6C:
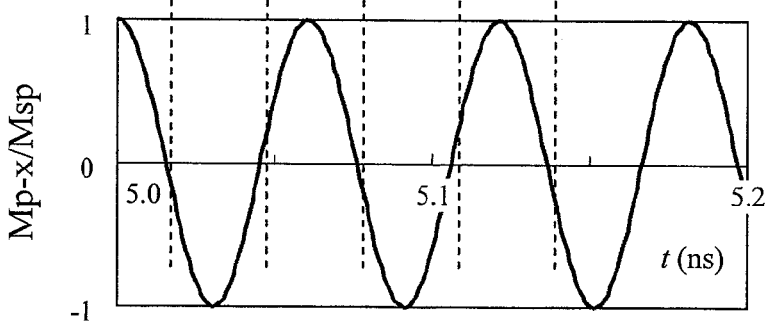
FIG. 6C is a view showing a temporal change in a perpendicular free layer magnetization x component of the STO of the present invention.
Figure 6D:
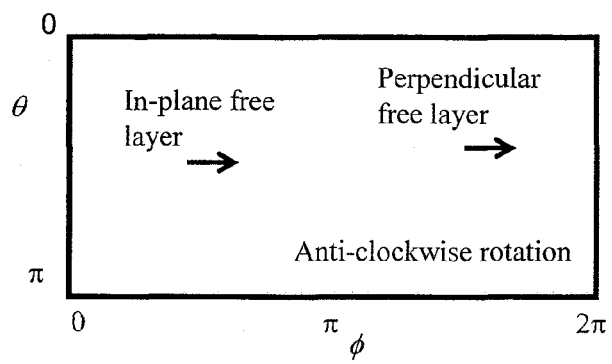
FIG. 6D is a view showing rotating directions of the in-plane free layer magnetization and the perpendicular free layer magnetization of the STO of the present invention.

FIGS. 6A to 6D are views showing temporal changes of magnetization of the perpendicular free layer 1 and that of the in-plane free layer 2 which constitute an STO of the present invention. Similar to FIG. 4, for a calculation model were assumed a magnetic body as a perpendicular free layer 1 (reference layer in FIG. 4) which has width of 40 nm×height of 40 nm×thickness of 10 nm, saturation flux density of 1.5 T, and perpendicular magnetic anisotropy $H_{kp}$ of 960 kA/m (12 KOe), and a soft magnet as an in-plane free layer (FGL in FIG. 4) which has width of 40 nm×height of 40 nm and height of 12 nm and saturation flux density of 2.3 T. Contrary to the case of FIG. 4, electric currents were applied from the in-plane free layer 2 side to the perpendicular free layer 1 side. The external magnetic field $H_{est}$ was applied to a +z direction with intensity of 480 kA/m, and magnitude of the STO drive current was 0.1 TA/m². FIGS. 6A, 6B, and 6C show values obtained by normalizing the z component of the in-plane free layer magnetization $M_h$ and the perpendicular free layer magnetization $M_p$, the x component $M_{h-x}$ of the in-plane free layer magnetization, and the x component $M_{p-x}$ of the perpendicular free layer magnetization, respectively, with saturation magnetization ($M_{sh}$, $M_{sp}$) of respective magnetic layers. In addition, FIG. 6D shows rotating direction of the magnetization.

In FIG. 6A, as the z components of the magnetization did not change after 1.3 n seconds till 10 n seconds in both of the perpendicular free layer magnetization and the in-plane free layer magnetization, it can be seen that a certain angle with the +z axis direction (field application direction) is maintained. As from FIG. 6B, the x component of the in-plane free layer magnetization orthogonal to the axis z regularly oscillates with sine waves, it is understood that the in-plane free layer magnetization tilts about 90 degrees from the z axis (x-y plane) and is turning with the z direction as an axis. In addition, with reference to FIG. 6C, as the perpendicular free layer magnetization similarly oscillates regularly with sine waves, it is understood that the perpendicular free layer magnetization tilts about 80 degrees (x-y plane) and is rotating with the z direction as an axis. Furthermore, it can be seen from comparison of FIGS. 6B and 6C that the perpendicular free layer magnetization and the in-plane free layer magnetization mutually face in almost opposite directions and are rotating closely in the plane, as their phases are mutually shifted about 180 degrees. The number of revolutions (oscillations) is about 16 GHz as it makes 3.1 turns in 0.2 n second. In addition, the reason why the z components of both of the free layer magnetizations once increased and then converged to around 16G (Mz=0) in FIG. 6A is that initial conditions used in the simulation were in relatively high energy state and there was a need to release the energy at the beginning Once reaching the stable oscillation state, the magnetization does not enter the high energy state immediately even by switching polarity of the external magnetic field.

FIG. 6D is a view showing how magnetization moves in minimal time such as about 0.01 n second, to examine a rotating direction of each magnetization. The definitions of the angles θ and φ are same as FIG. 4D. As both of the in-plane free layer magnetization and the perpendicular free layer magnetization move in a direction in which φ increases, it can be seen that they rotate clockwise toward the +z direction to which the external magnetic field is applied. In MAMR, the rotating direction is a preferred direction which generates radio-frequency polarized fields with higher magnetization switching efficiency of a recoding medium when a magnetic field from a main pole is used as an applied field to an STO which is arranged in the proximity of the main pole.

The newly discovered oscillation mode of the present invention in which the perpendicular free layer magnetization and the in-plane free layer magnetization are antiparallel and rotating almost in the x-y plane is hereinafter referred to as AF-mode. In the AF-mode oscillation, with spin torques resulting from application of electric currents from the in-plane free layer side to the perpendicular free layer side, the action of the in-plane free layer magnetization following the perpendicular free layer magnetization and the action of the perpendicular free layer magnetization escaping from the in-plane free layer magnetization are autonomously balanced. In addition, while the in-plane free layer magnetization rotates mostly in the x-y plane, the perpendicular free layer magnetization slightly tilts from the x-y plane to the direction of the external magnetic field. Thus, it is expected that tilt deviation from the axis z of the perpendicular free layer magnetization is slight, and prompt switching is possible, even when the external magnetic field direction is even switched.

Figure 7A:
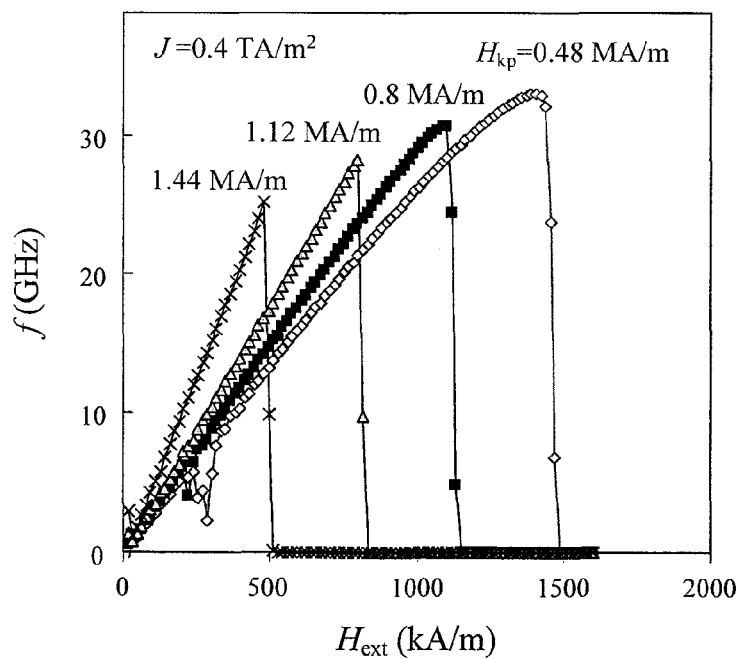
FIG. 7A is a view showing external magnetic field dependency of an AF mode oscillatory frequency of an STO.

FIG. 7A shows external magnetic field dependency of AF-mode oscillatory frequency when a soft magnet having width of 40 nm×height of 40 nm and thickness of 12 nm and saturation flux density of 2.3 T as an in-plane free layer, and magnetic bodies having width of 40 nm×height of 40 nm×thickness ($t_p$) of 3 nm, saturation flux density $B_{sp}$ of 1.5 T, and perpendicular magnetic anisotropy $H_{kp}$, which is attributable to materials, of 0.48 MA/m (6 kOe), 0.80 MA/m (10 kOe), 1.12 MA/m (14 kOe), and 1.44 MA/m (18 kOe) are used. Effective demagnetizing field $H_{dp\text{-}eff}$ in a direction perpendicular to a film surface of the perpendicular free layer (=4 πMsp×($N_{pz}$−$N_{px}$), where $M_{sp}$ is saturation magnetization of the perpendicular free layer, and $N_{pz}$ and $N_{psx}$ are demagnetizing factors in the z direction and the x direction, respectively) is 1.09 MA/m. STO drive currents are applied from the in-plane free layer side to the perpendicular free layer side.

With reference to FIG. 7A, with the condition of each perpendicular magnetic anisotropy, the more intensely an external magnetic field $H_{ext}$ is applied, the higher oscillatory frequency is. However, when a value of $H_{ext}$+$H_{kp}$ reaches a certain value (here about 2000 kA/m) which is defined by an electric current value and a value of an effective demagnetizing field in the perpendicular direction of the perpendicular free layer, magnetization of the perpendicular free layer cannot stay in the plane and faces the field application direction, and thus AF-mode oscillation cannot be maintained. It seems that the smaller the perpendicular magnetic anisotropy field $H_{kp}$ of the perpendicular free layer is, the higher oscillatory frequency can be obtained. However, when the external magnetic field $H_{ext}$ is under certain conditions, the larger $H_{kp}$ is, the higher oscillatory frequency can be obtained, as far as the STO oscillates. In MAMR, as recording is performed on a recording medium capable of higher areal recording density, it is necessary to increase oscillatory frequencies of the STO. It is effective to increase external (gap) fields to be applied to the STO and use the perpendicular free layer with as large $H_{kp}$ as possible which oscillates corresponding to this.

Figure 7B:
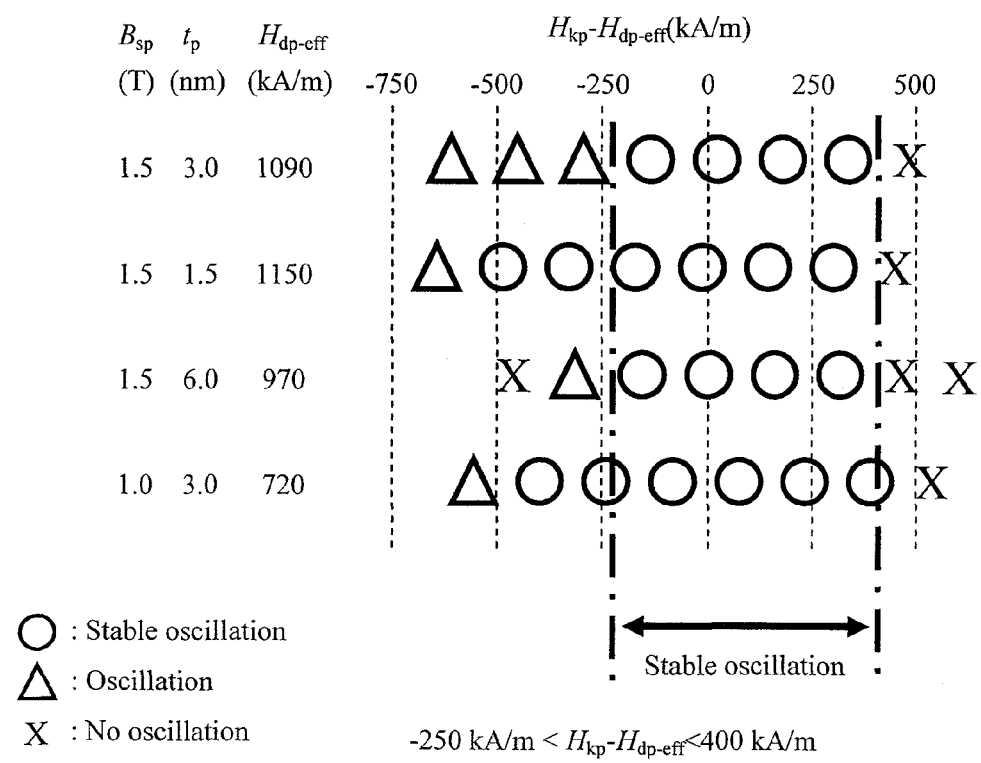
FIG. 7B is a view showing findings of AF mode oscillation state which is examined by changing a perpendicular magnetic anisotropy field, for a combination of magnetization and thickness of the perpendicular free layer.

Setting of perpendicular magnetic anisotropy is a key point to implement MAMR by achieving stable oscillation (magnetization rotation) state in the AF mode. FIG. 7B shows results of the examination in which state of AF-mode oscillation was examined by changing the perpendicular magnetic anisotropy field $H_{kp}$, which is attributable to materials of the perpendicular free layer, for various combinations of saturation flux density $B_{sp}$ and thickness $t_p$ of the perpendicular free layer. For each combination, when a value obtained by subtracting from $H_{kp}$ the effective demagnetizing field $H_{dp\text{-}eff}$ in the perpendicular direction is smaller than −250 kA/m, unstable oscillation occurs in some cases. When the perpendicular magnetic anisotropy is 480 kA/m or 800 kA/m in FIG. 7A, it is believed that oscillation is unstable in a low field area where $H_{ext}$ is 250 kA/m because the value obtained by subtracting $H_{dp\text{-}eff}$ from $H_{kp}$ is too small, i.e., −610 (=480−1090) kA/m, and −290 (=800−1090)/kA/m. When the value obtained by subtracting the effective demagnetizing field $H_{dp\text{-}eff}$ from $H_{kp}$ is larger than 400 kA/m, AF-mode oscillation cannot be energized. It is believed that the magnetization of the perpendicular free layer faces the direction of the perpendicular magnetic anisotropy field, thus not entering the AF mode. Therefore, in order to achieve stable AF-mode oscillation, the magnetic anisotropy field of the perpendicular free layer attributable to materials and the effective demagnetizing field in the direction perpendicular to the film surface need to nearly balance in reverse directions. It is necessary that the value obtained by subtracting $H_{dp\text{-}eff}$ from $H_{kp}$ is from −250 kA/m to 400 kA/m. When $H_{kp}$>$H_{dp\text{-}eff}$ in the range mentioned above, higher oscillatory frequencies can be obtained. However, preconditioning oscillation of about 1 to 2 n seconds before the perpendicular free layer magnetization falls into the plane from the direction perpendicular to the surface is needed after the STO drive current is applied and before writing state is entered. When $H_{kp}$<$H_{dp\text{-}eff}$, writing state can be entered promptly after the STO drive current is applied.

Figure 7C:
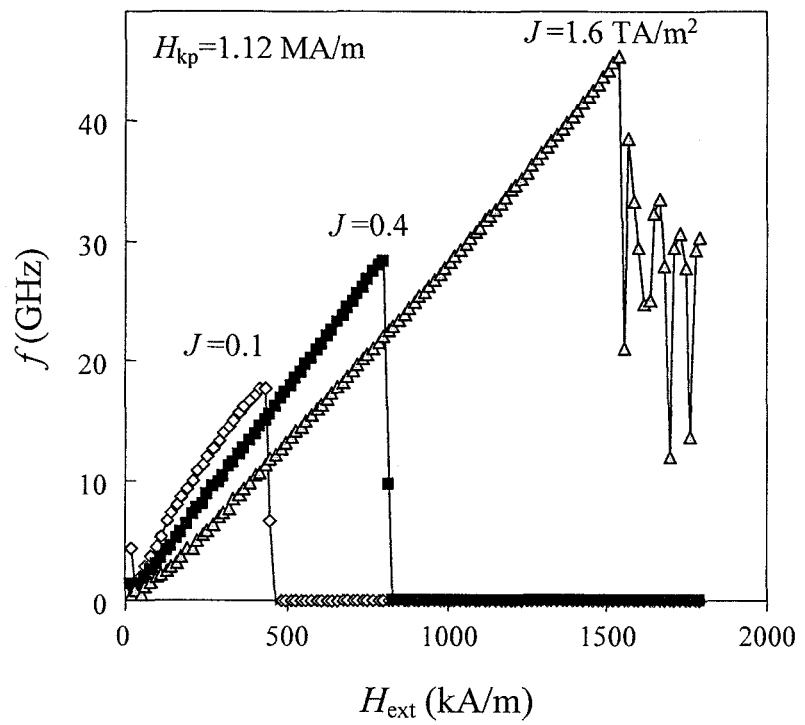
FIG. 7C is a view showing the external magnetic field dependency of an STO oscillatory frequency with an amount of electric currents as a parameter.

FIG. 7C shows external magnetic field dependency of an oscillatory frequency when the amount of current is 0.1 and 1.6 with the amount of current in FIGS. 7A and 7B as 0.4 TA/m², for an STO as a perpendicular free layer having width of 40 nm×height of 40 nm×thickness of 3 nm, saturation flux density of 1.5 T, and perpendicular magnetic anisotropy $H_{kp}$ of 1.12 mA/m.

With teach current condition, the more intensely an external magnetic field $H_{ext}$ is applied, the higher oscillatory frequency is.

Although the smaller the current value is, the higher oscillatory frequency can be obtained, when the external magnetic field $H_{ext}$ is under certain conditions, and as far as the STO oscillates, the larger the current value is, the higher oscillatory frequency can be obtained. The highest oscillatory frequency can be obtained by increasing electric currents that can be applied to the STO, increasing the external (gap) fields to be applied to the STO, and using a perpendicular free layer having as high perpendicular magnetic anisotropy $H_{kp}$ as possible which oscillates corresponding to these. In the STO of the present invention which utilizes the AF-mode oscillation, as in-plane free layer magnetization is almost in the plane, radio-frequency output (fields) can be maximized with the number of revolutions (oscillations) which is optimal for magnetization switching of the recording medium, by setting appropriate perpendicular free layer magnetization and perpendicular magnetic anisotropy. It is assumed that the STO of the present invention is arranged between a main pole and an auxiliary magnetic pole. In order to intensify the external (gap) field, shortening a distance between the main pole and auxiliary magnetic pole is effective.

Figure 7D:
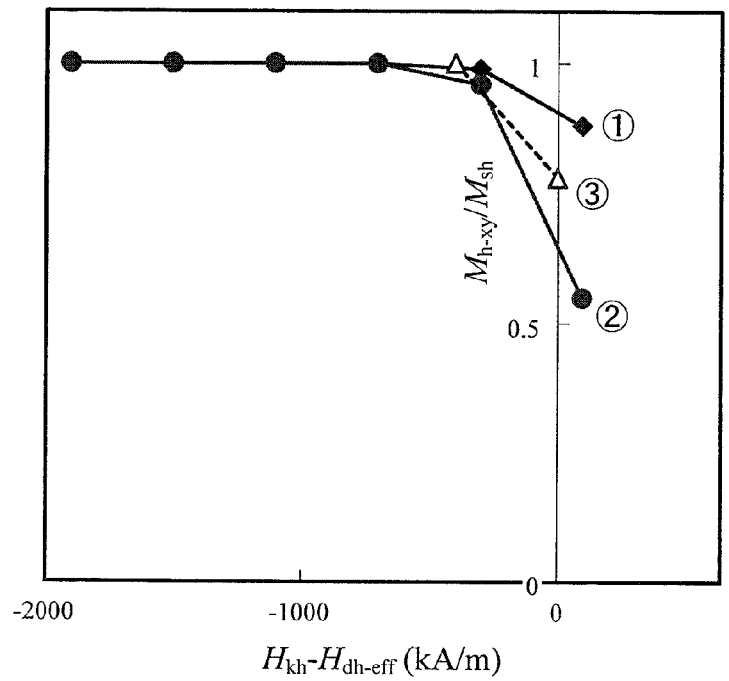
FIG. 7D is a view showing dependency of in-plane magnetic components of the in-plane free layer on values obtained by subtracting from the magnetic anisotropy field attributable to materials the effective demagnetizing field, under various conditions.

FIG. 7D shows in-plane magnetization components $M_{h-xy}$ of the in-plane free layer in AF-mode oscillation state under various conditions as a function of the value obtained by subtracting the effective demagnetizing field $H_{dp-eff}$ from the perpendicular magnetic anisotropy field $H_{kp}$ which is attributable to materials. In the figure, a negative value of $H_{hk}$ was made possible by changing $H_{hk}$ on the assumption of the case in which a negative magnetic anisotropy material such as (Co/Fe)n multilayer is used. The perpendicular magnetic anisotropy $H_{pk}$ being negative means that the in-plane free layer has magnetic anisotropy of the magnetic facilitated face type. In the figure, $M_{h-xy}$ is normalized with saturation magnetization $M_{sh}$ of the in-plane free layer. When a value at $M_{h-xy}/M_{sh}$ is 1.0, it means that the in-plane free layer magnetization is in the plane, and indicates that intensity of the high-frequency magnetic field is maximum.

It was seen from FIG. 7D that even under various conditions, the maximum high-frequency magnetic field intensity could be obtained as far as the value of $H_{kh}-H_{dh-eff}$ was smaller than −200 kA/m. Based on this, application of materials with negative perpendicular magnetic anisotropy, namely, CoIr alloy, CoFeIr alloy, (Co/Fe)n multilayer, which have the magnetization easy plane is effective, in particular, in a high track density capable head whose track width is narrow and has a small effective demagnetizing field. With the above, it was revealed that an in-plane free layer needs to be a magnetic film having an effective demagnetizing field which is more predominant than a magnetic anisotropy field which is in a direction perpendicular to a film surface and attributable to materials, in other words, a magnetic film having effectively a magnetization easy plane as a film surface.

Figure 8A:
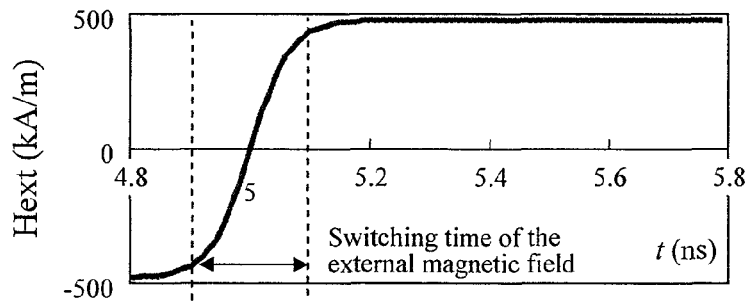
FIG. 8A is a view showing a temporal change in the external magnetic field switching used in the calculations.
Figure 8B:
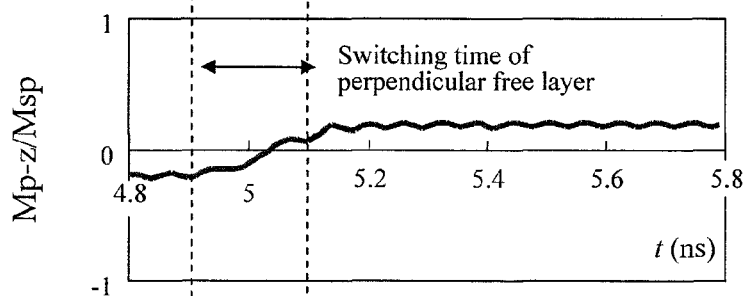
FIG. 8B is a view showing a temporal change in the perpendicular free layer magnetization z component of the STO of the present invention.
Figure 8C:
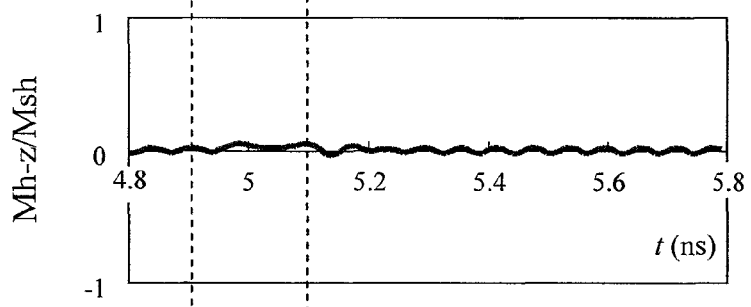
FIG. 8C is a view showing a temporal change in the in-plane free layer magnetization z component of the STO of the present invention.
Figure 8D:
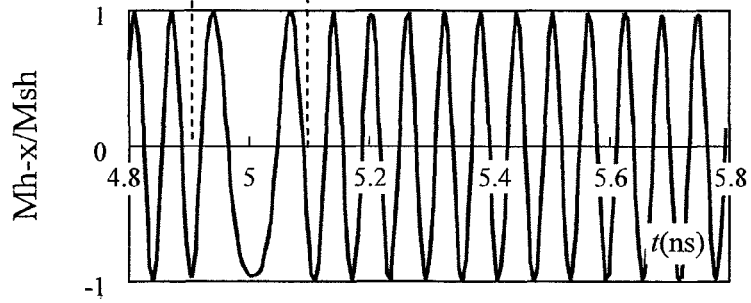
FIG. 8D is a view showing a temporal change in the in-plane free layer magnetization x component of the STO of the present invention.

FIGS. 8A to 8B show temporal changes of perpendicular free layer magnetization and in-plane free layer magnetization during switching of an external magnetic field in the AF mode (STO of the present invention). Of the conditions shown in the uppermost column of FIG. 7B, the perpendicular magnetic anisotropy $H_{kp}$ of the perpendicular free layer of 960 kA/m ($H_{kp}-H_{dp-eff}=130$ kA/m) was used. The magnitude of the external magnetic field $H_{ext}$ is 480 kA/m and an STO drive current is 0.3 TA/m². FIG. 8A shows a temporal profile of the external magnetic field whose polarity is switched from the minus z direction to the plus z direction at t=5n seconds, and in which a hyperbola secant function (tan h) by which time from start of switching till completion of the switching is about 0.2 n second is used. FIG. 8B shows the magnetization switching (z component) of the perpendicular free layer, FIG. 8C shows the switching (z component) of the in-plane free layer magnetization, and FIG. 8D shows the rotation (x component) of the in-plane free layer magnetization with the z direction as an axis.

According to FIGS. 8A and 8B, the perpendicular free layer magnetization starts the rotation simultaneously with the start of the switching of the external magnetic field, and completes the rotation simultaneously with the completion of the switching of the external magnetic field. According to FIGS. 8B and 8C, while the perpendicular free layer magnetization is switched, the in-plane free layer magnetization does not shift from the stable oscillation position ($M_{vz}=0$) where the output field is maximum. Therefore, time needed from when the switching of the external magnetic field starts to when the stable oscillation state is reached is only about 0.2n second taken for the switching of the external magnetic field. Thus, states switched while the perpendicular free layer magnetization and the in-plane free layer magnetization were kept almost antiparallel, and it was learned that high-speed switching was possible. It is believed that the behavior of $M_{vx}$ during this time as seen in FIG. 8D reflects the situation in which in-plane rotating speed of the in-plane free layer magnetization decelerated and the rotating directions switched. This does not conflict with the behavior of the oscillatory frequency to the external magnetic field in FIGS. 7A and 7C. Since magnetic resonance frequencies of magnetic particles being switched decrease during magnetization switching of the magnetic recording medium, use of the STO of the present invention enables the switching of the magnetic particles during magnetization switching to be efficiently microwave assisted while the external (writing) fields are switched.

Figure 9A:
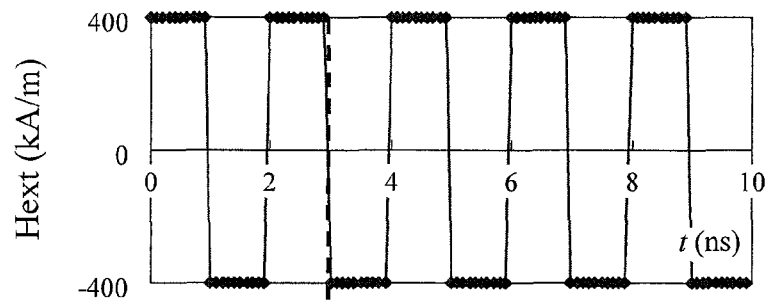
FIG. 9A is a view showing a temporal change in the external magnetic field high-speed switching used in the calculations.
Figure 9B:
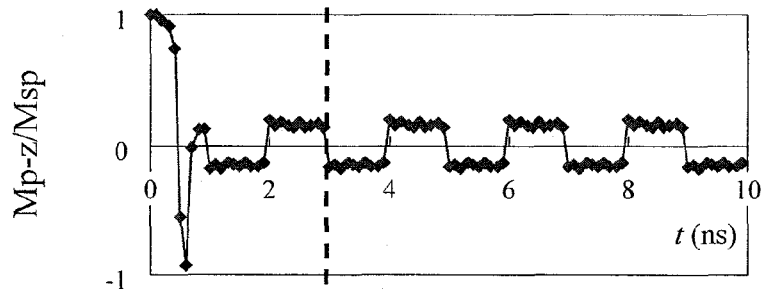
FIG. 9B is a view showing a temporal change in the perpendicular free layer magnetization z components of the STO of the present invention.
Figure 9C:
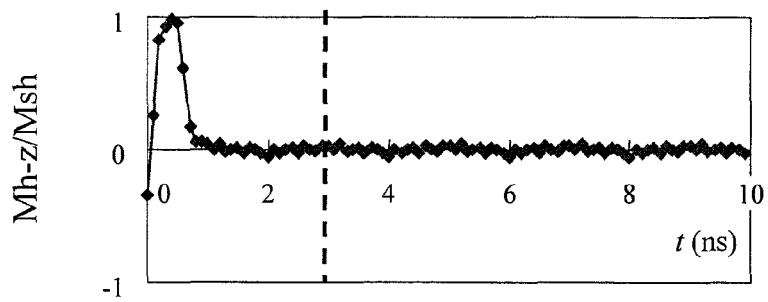
FIG. 9C is a view showing a temporal change in the in-plane free layer magnetization z component of the STO of the present invention.

In order to examine potentials of radio-frequency response characteristics of the AF-mode in detail, the external magnetic field in FIG. 9A was provided with a temporal change by high-speed switching at the switching time of 0.1 n second or lower under the same conditions as FIG. 8. The external magnetic field was applied in the z direction. FIG. 9B shows a temporal change of the perpendicular free layer magnetization z component in response to this external magnetic field. FIG. 9C shows a temporal change of the in-plane free layer magnetization z component.

It can be seen from FIG. 9B that after 1 n second, the perpendicular free layer magnetization is switched, completely following the external magnetic field. In addition, as shown in FIG. 9C, after 1 n second, the in-plane free layer magnetization does not nearly shift from the stable oscillation position ($M_{vz}=0$) where the output field is maximum. In addition, the behavior of the perpendicular free layer magnetization and the in-plane free layer magnetization before 1 n second was due to the state which widely deviated from good AF oscillation state and which was set as the initial state for calculation. Thus, it is believed that once they enter the AF-mode oscillation, adequate high-speed switching characteristics can be obtained. It is believed that if assisted recording is performed in the AF-mode oscillation after a long-term pause, preconditioning driving of about 1-2 n seconds is needed.

Figure 10A:
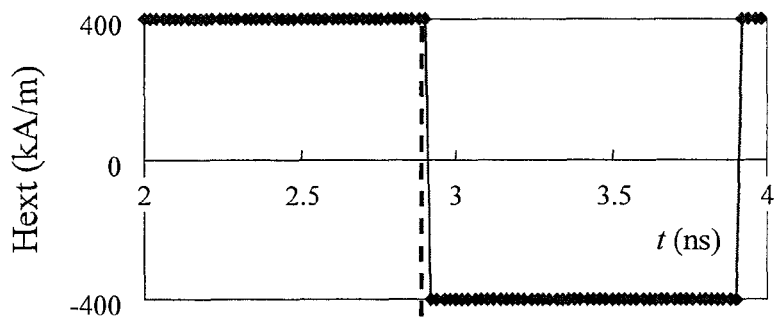
FIG. 10A is a time expanded view of FIG. 9A.
Figure 10B:
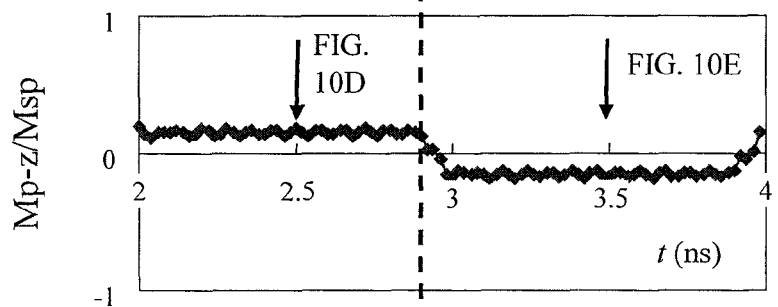
FIG. 10B is a time expanded view of FIG. 9B.
Figure 10C:
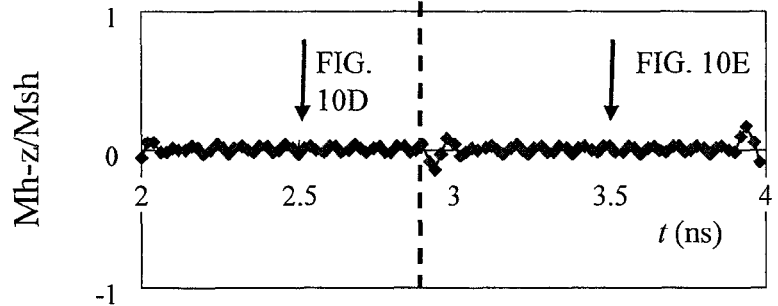
FIG. 10C is a time expanded view of FIG. 9C.

FIGS. 10A to 10C further expand how the magnetization behaves during switching of the external magnetic field which is close to 3 n seconds of FIGS. 9A to 9C. FIG. 10A corresponds to FIG. 9A, FIG. 10B to FIG. 9B, and FIG. 10C to FIG. 9C. As shown in FIG. 10B, the perpendicular free layer magnetization starts to switch immediately after the switching of the external magnetic fields, and completes the switching in about 0.1 n second. As shown in FIG. 10C, during this time, the in-plane free layer magnetization slightly shifts from the stable oscillation position.

Figure 10D:
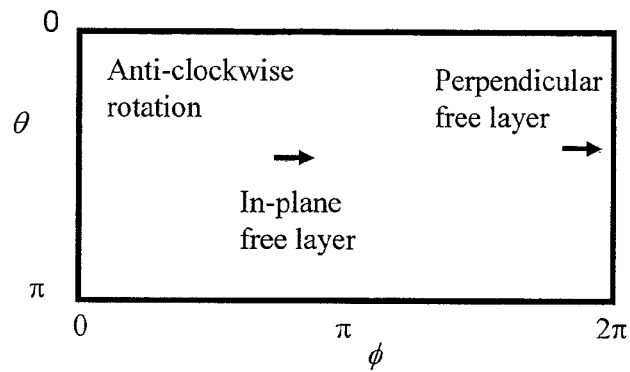
FIG. 10D is a view showing rotating directions of the perpendicular free layer magnetization and the in-plane free layer magnetization at 2.5 seconds of FIG. 10B and FIG. 10C.
Figure 10E:
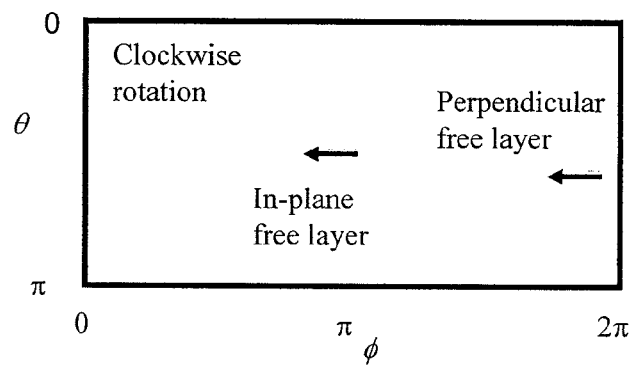
FIG. 10 E is a view showing rotating directions of the perpendicular free layer magnetization and the in-plane free layer magnetization at 3.5 seconds of FIG. 10B and FIG. 10C.

FIG. 10D shows rotating directions of the perpendicular free layer magnetization and the in-plane free layer magnetization at 2.5 n seconds of FIGS. 10B and 10C. In addition, FIG. 10E shows rotating directions of the perpendicular free layer magnetization and the in-plane free layer magnetization at 3.5 seconds of FIGS. 10B and 10C. The definitions of the angles θ and φ are same as FIG. 4D. The rotating directions at 2.5 n seconds and at 3.5 n seconds are switched, and it can be confirmed that the rotating directions of the perpendicular free layer magnetization and the in-plane free layer magnetization have been reliably switched according to the external magnetic fields.

Figure 11:
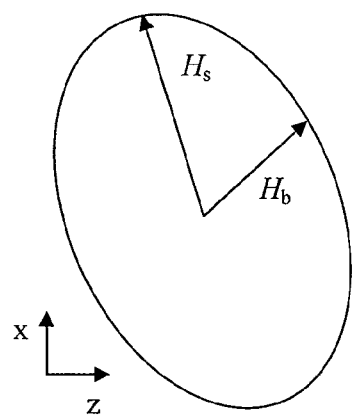
FIG. 11 is a view showing a method for determining a high-frequency magnetic field component which is effective for magnetization switching.

In order to review effects of the microwave assisted magnetization switching by high-frequency magnetic fields to be generated from the STO in the AF-mode oscillation state an effective high-frequency magnetic field component $H_{hf-eff}$ is determined. The high-frequency magnetic fields result from addition of magnetic fields from the bottom faces (including the upper base) and lateral sides of the perpendicular free layer and the in-plane free layer. The magnetic fields from the bottom faces and those from the lateral sides generally are not orthogonal, except on a track center. This being considered, the high-frequency magnetic field component $H_{hf\text{-}eff}$ which is effective for the microwave assisted switching to be generated from the FGL needs to be determined. Since the high-frequency magnetic field is considered to be a composite field of a magnetic field $H_b$ from the bottom face and a magnetic field $H_s$ from the lateral side whose phases are mutually shifted about 90 degrees, as shown in FIG. 11, it is expressed as the expression (2) below:

$$\vec{H}_{hf} = \vec{H}_h \cos(\omega t) + \vec{H}_s \sin(\omega t) \quad (2)$$

Here, the magnetic field component effective for assistance is approximate to being parallel in the medium surface and obtains the following expression (3):

$$\vec{H}_b = (H_{bh\text{-}z} - H_{bp\text{-}z})e_z + (H_{bh\text{-}x} - H_{bp\text{-}x})e_x = H_{b\text{-}z}e_z + H_{b\text{-}x}e_x$$

$$\vec{H}_s = (H_{sh\text{-}z} - H_{sp\text{-}z})e_z + (H_{sh\text{-}x} - H_{sp\text{-}x})e_x = H_{s\text{-}z}e_z + H_{s\text{-}x}e_x \quad (3)$$

When the expressions (3) are substituted into the expression (2), the following expression (4) is obtained.

$$\begin{aligned}\vec{H}_{hf} &= \vec{H}_b \cos(\omega t) + \vec{H}_s \sin(\omega t) \\ &= (H_{b\text{-}z}\cos(\omega t)e_z + H_{s\text{-}x}\sin(\omega t)e_x) + \\ & \quad (H_{s\text{-}z}\sin(\omega t)e_z + H_{b\text{-}x}\cos(\omega t)e_x) \\ &= (H_{b\text{-}z}\cos(\omega t)e_z + H_{s\text{-}x}\sin(\omega t)e_x) + \\ & \quad (H_{s\text{-}z}\cos(\omega t - \pi/2)e_z - H_{b\text{-}x}\sin(\omega t - \pi/2)e_x) \\ &= \frac{H_{b\text{-}z}+H_{s\text{-}x}}{2}\exp(i\omega t) + \frac{H_{b\text{-}z}-H_{s\text{-}x}}{2}\exp(-i\omega t) + \\ & \quad \frac{H_{s\text{-}z}-H_{b\text{-}x}}{2}\exp(i\omega t - \pi/2) + \frac{H_{s\text{-}z}+H_{b\text{-}x}}{2}\exp(-i\omega t + \pi/2)\end{aligned} \quad (4)$$

Furthermore, if only anti-clockwise component which acts on the microwave assisted magnetization switching is considered and $\exp(-i\omega t)$ term is ignored, the expression will be as (5) below. The suffixes h, p of H signify the in-plane free layer and the perpendicular free layer, respectively.

$$H_{hf\text{-}eff} = \sqrt{\left(\frac{H_{b\text{-}z}+H_{s\text{-}x}}{2}\right)^2 + \left(\frac{H_{s\text{-}z}-H_{b\text{-}x}}{2}\right)^2} \\ = \sqrt{\left(\frac{H_{bh\text{-}z}-H_{bp\text{-}z}+H_{sh\text{-}x}-H_{sp\text{-}x}}{2}\right)^2 + \left(\frac{H_{sh\text{-}z}-H_{sp\text{-}z}-H_{bh\text{-}x}+H_{bp\text{-}x}}{2}\right)^2} \quad (5)$$

FIGS. 12A and 12B to FIGS. 15A and 15B show examinations of the effect which the effective high-frequency magnetic field component $H_{hf\text{-}eff}$ by the AC-mode has on the writing characteristics. In every case, STO drive currents are applied from the in-plane free layer 2 side to the perpendicular free layer 1 side. In this review, although the in-plane free layer 2 or the perpendicular free layer 1 is placed being separated, by way of example, 20 nm from the main pole 5, advantageous effect of the present invention shall be obtained without being limited to the value. Similarly, although a gap for a non-magnetic spin conductor between the in-plane free layer 2 and the perpendicular free layer 1 is 3 nm, the advantageous effect of the present invention can be expected without using the value. The graph in the figure shows a change in $H_{hf\text{-}eff}$ on the STO side relative to a distance from the main pole end on the STO side, on the assumption that when a write field is applied to a recording medium, a magnetic field from the main pole 5 is first applied and then a high-frequency magnetic field from the STO is applied to the medium. A write point is a point away from the main pole from among half-value points at the peak when $H_{hf\text{-}eff}$ is highest. When the main pole polarity is switched, a magnetization transition area is formed at the write point.

Figure 12A:
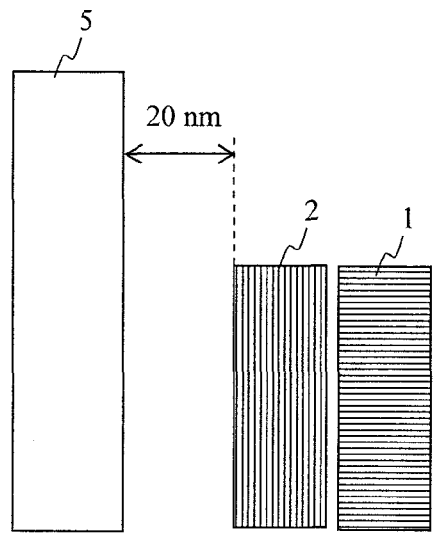
FIG. 12A is a schematic configuration diagram showing a configuration of an STO.
Figure 12B:
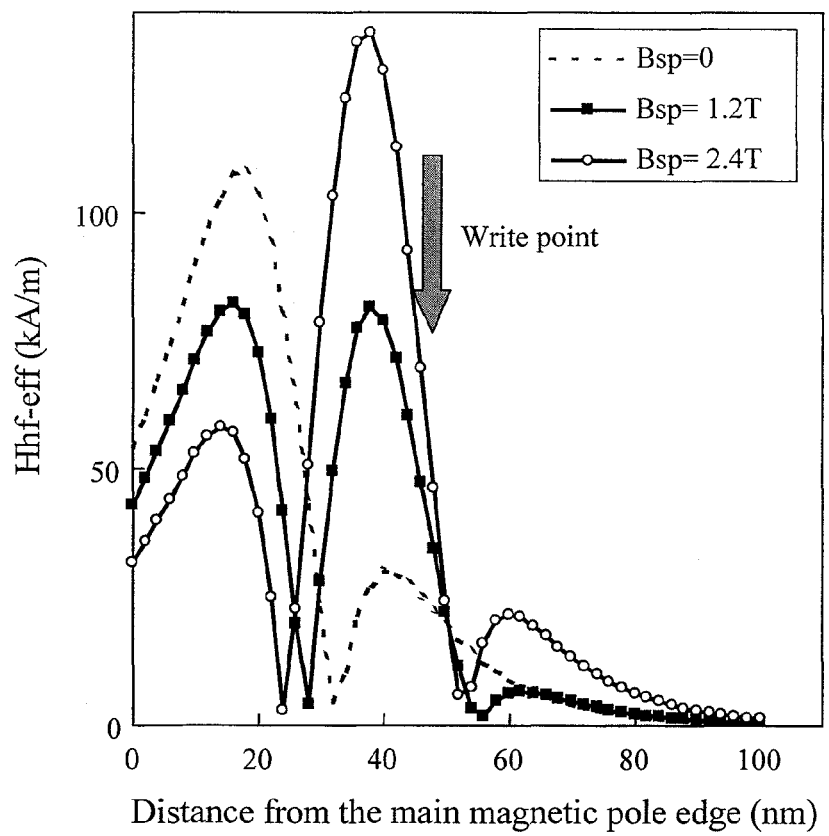
FIG. 12B is a view showing dependency on a distance from a main pole of the effective high-frequency magnetic field component.

FIG. 12A is a schematic configuration diagram showing an embodiment of the STO in which a perpendicular free layer 1 having same thickness as an in-plane free layer 2 is arranged on the opposite side of a main pole 5. Thickness of both of the perpendicular free layer 1 and the in-plane free layer 2 is made 15 nm. Saturation flux density $B_s$ of the in-plane free layer is made 2.3 T. A distance between the main pole 5 and the in-plane free layer 2 is 20 nm. FIG. 12B shows dependency of $H_{hf\text{-}eff}$ on a distance from the main pole end when the saturation flux density of the perpendicular free layer 1 is 1.2 T and 2.4 T in the arrangement as shown in FIG. 12A. For comparison, $H_{hf\text{-}eff}$ of only the in-plane free layer (FGL of the conventional STO) is shown by the dash line with $B_{sp}=0$.

Peaks of $H_{hf\text{-}eff}$ shall be referred to as first peak, second peak and so on from the main pole side. Although there is a problem that as the saturation flux density $B_{sp}$ of the perpendicular free layer increases, the second peak exceeds the first peak, and the write point is farther from the main pole (25 nm→50 nm), a peak value of the effective high-frequency magnetic field is 1.3 times higher than the conventional STO when $B_{sp}=2.4$ T. Therefore, the STO of the embodiment had better be combined with a head (main pole) which can have effect of a magnetic field on a position away from the main pole.

Figure 13A:
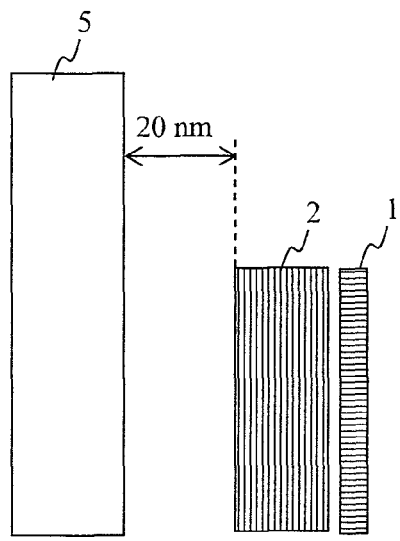
FIG. 13A is a schematic configuration diagram showing a configuration of an STO.
Figure 13B:
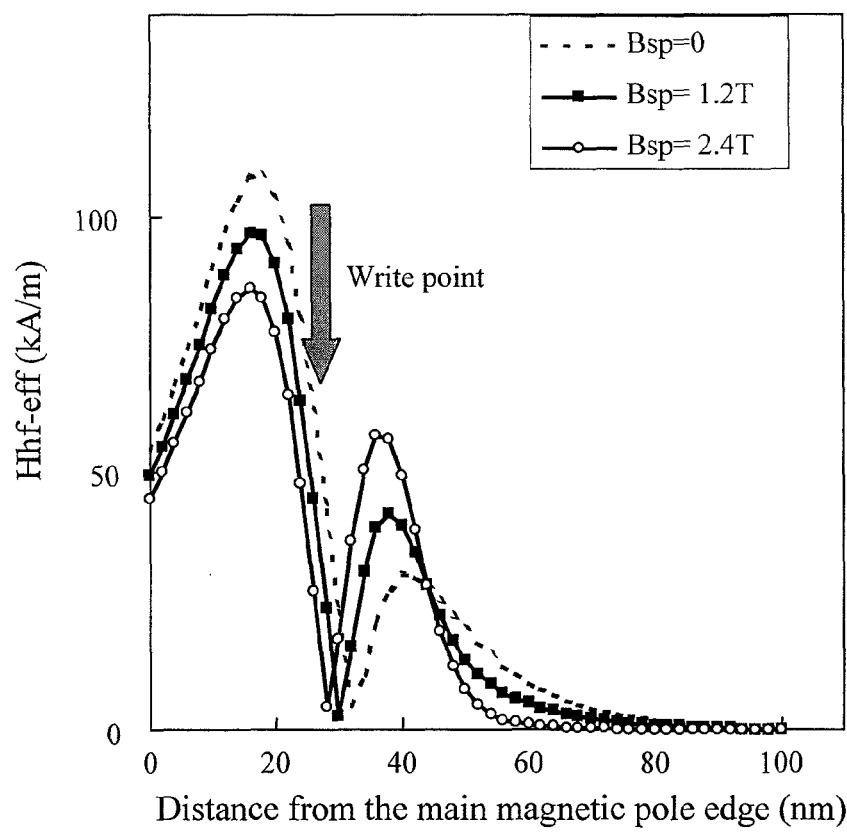
FIG. 13B is a view showing dependency on a distance from a main pole of the effective high-frequency magnetic field component.

FIG. 13A is a schematic configuration diagram showing an embodiment of an STO in which a perpendicular free layer 1 which is thinner than an in-plane free layer is arranged on the opposite side of a main pole 5. Thickness of the perpendicular free layer is 5 nm. Thickness of the in-plane free layer 2 is 15 nm, and saturation flux density $B_s$ is 2.3 T. A distance between the main pole 5 and the in-plane free layer 2 is 20 nm. FIG. 13B shows dependency of $H_{hf\text{-}eff}$ on a distance from the main pole end when the saturation flux density of the perpendicular free layer 1 is 1.2 T and 2.4 T in the arrangement as shown in FIG. 13A. Since the second peak increases and the write point gets closer to the main pole side as $B_s$ of the perpendicular free layer increases, it is concerned that separation characteristics will degrade (re-switching of magnetization due to the second peak). However, there is an advantage that the write point of the first peak is closer to the main pole. Therefore, the STO of the embodiment had better be combined with a head (main pole) having high magnetic field gradient.

Figure 14A:
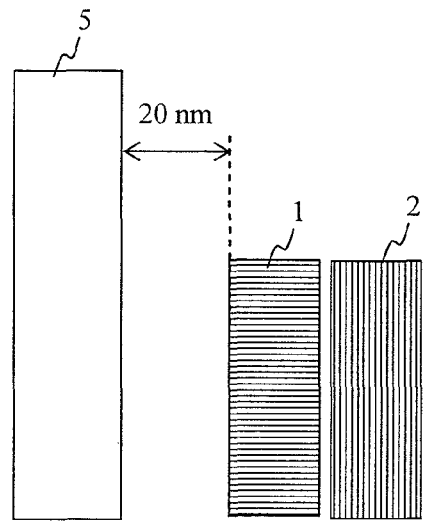
FIG. 14A is a schematic configuration diagram showing a configuration of an STO.
Figure 14B:
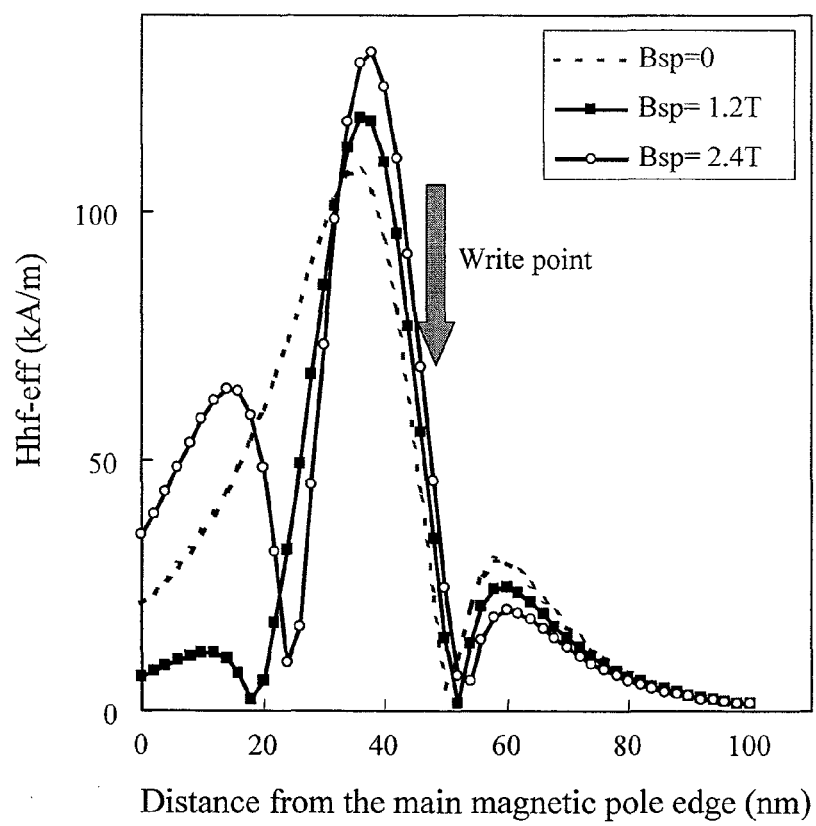
FIG. 14B is a view showing dependency on a distance from a main pole of the effective high-frequency magnetic field component.

FIG. 14A is a schematic configuration diagram showing an embodiment of an STO in which a perpendicular free layer 1 having same thickness as an in-plane free layer, is arranged between a main pole 5 and the in-plane free layer 2. Thickness of both of the perpendicular free layer 1 and the in-plane free layer 2 are 15 nm. Saturation flux density Bs of the in-plane free layer 2 is 2.3 T. A distance between the main pole 5 and the perpendicular free layer 1 is 20 nm. FIG. 14B shows dependency of $H_{hf\text{-}eff}$ on a distance from the main pole end when the saturation flux density of the perpendicular free layer 1 is 1.2 T and 2.4 T in the arrangement as shown in FIG. 14A. Although the write point is away from the main pole, there is the advantageous effect that the write field peak is boosted (1.3 times higher than the conventional STO when Bsp=2.4 T) and third peak is made lower. Therefore, the STO of the embodiment had better be combined with a head (main pole) which can have effect of a magnetic field on a position away from the main pole.

Figure 15A:
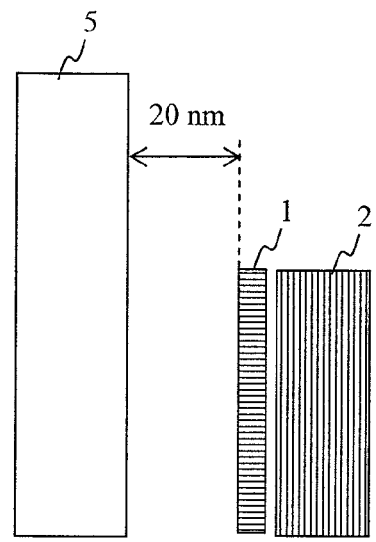
FIG. 15A is a schematic configuration diagram showing a configuration of an STO.
Figure 15B:
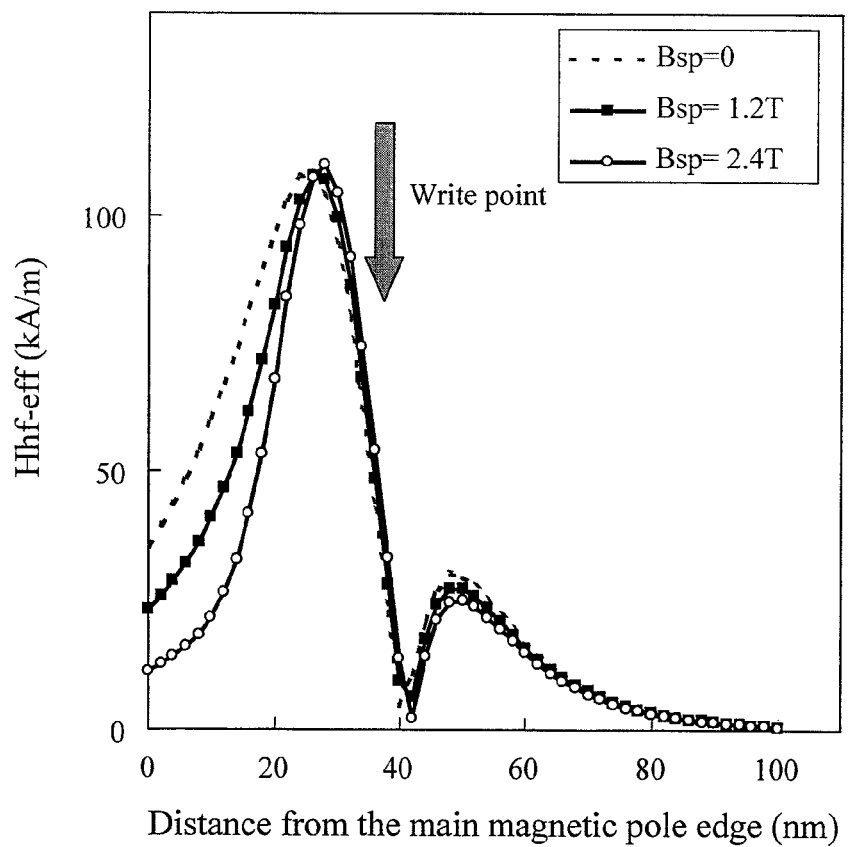
FIG. 15B is a view showing dependency on a distance from a main pole of the effective high-frequency magnetic field component.

FIG. 15A is a schematic configuration diagram showing an embodiment of an STO in which a perpendicular free layer 1 which is thinner than an in-plane free layer 2 is arranged between a main pole 5 and the in-plane free layer 2. Thickness of the in-plane free layer 2 is 15 nm and saturation flux density $B_s$ is 2.3 T. Thickness of the perpendicular free layer 1 is 5 nm. A distance between the main pole 5 and the perpendicular free layer 1 is 20 nm. FIG. 15B shows dependency of $H_{hf\text{-}eff}$ on a distance from the main pole end when the saturation flux density of the perpendicular free layer 1 is 1.2 T and 2.4 T in the arrangement as shown in FIG. 15A. When the perpendicular free layer on the main pole side is thin, the advantageous effect of boosting the write field peak is not great. However, a shift of the write point is almost independent of magnetization of the perpendicular free layer. Therefore, the STO of the embodiment is capable of high-speed data transfer with the writing characteristics equivalent to the conventional STO.

Figure 16A:
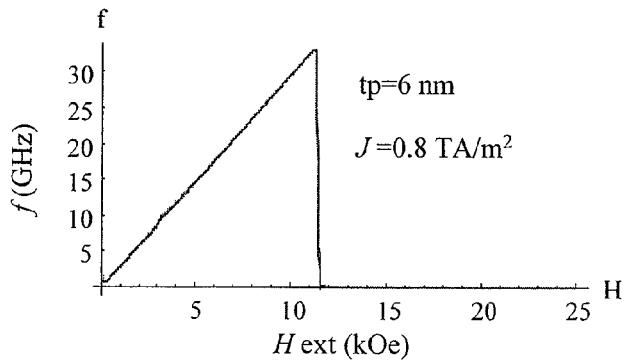
FIG. 16A is a view showing a relationship of an oscillatory frequency of the STO of the present invention and an external magnetic field.
Figure 16B:
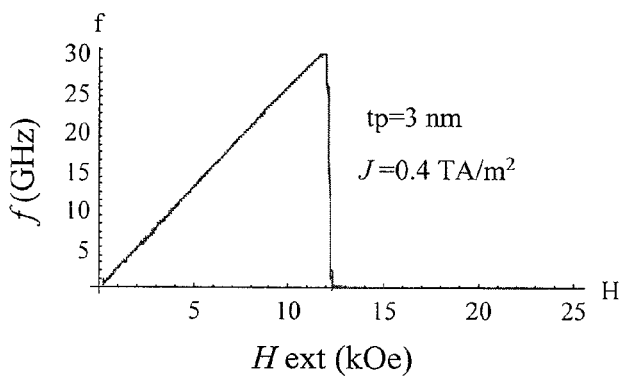
FIG. 16B is a view showing a relationship of an oscillatory frequency of the STO of the present invention and an external magnetic field.
Figure 16C:
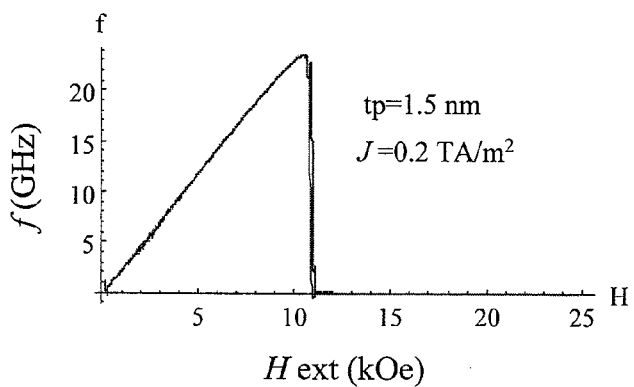
FIG. 16C is a view showing a relationship of an oscillatory frequency of the STO of the present invention and an external magnetic field.

FIGS. 16A to 16C are views showing dependency of an AF-mode oscillatory frequency on an external magnetic field when electric currents are applied from an in-plane free layer side to a perpendicular free layer side. A soft magnet having width of 40 nm×height of 40 nm×thickness of 12 nm and saturation flux density of 2.3 T is used for the in-plane free layer, and magnetic bodies having saturation density flux $B_s$ of 1.5 T, perpendicular magnetic anisotropy $H_{kp}$ of 0.96 MA/m (12 kOe), width of 40 nm×height of 40 nm, and different thickness of 6 nm, 3 nm, and 1.5 nm are used for the perpendicular free layer. When electric current values were changed to prevent oscillation characteristics from considerably changing due to film thickness of the perpendicular free layer, it was learned that the electric current values decreased almost inversely with the film thickness. Based on this, it is believed that unlike the conventional STO which oscillates in the T-mode, electric current values necessary for the AF-mode oscillation are mainly determined by the film thickness of the perpendicular free layer. Therefore, in the STO which oscillates in the AF-mode, a thick in-plane free layer which can achieve intense high-frequency magnetic fields without substantially increasing necessary driving current values can be applied It is expected that combination with the STO structure shown in FIGS. 13A and 15B will achieve electric power saving and improve oscillatory frequencies. If a magnetic body with negative magnetic anisotropy is used as an in-plane free layer, more stable oscillation characteristics can be obtained. In addition, if a perpendicular free layer is arranged between a main pole and the in-plane free layer, there is an advantage that the degree of freedom in designing increases because a write point does not widely change due to magnetization or thickness of the perpendicular free layer.

With the above, in a magnetic recording head for recording information by arranging a spin torque oscillator in the vicinity of a main pole which generates switching fields, and causing the spin torque oscillator to generate high-frequency magnetic fields and a recording medium to switch magnetic resonance states/magnetization, it was learned that high-speed magnetization switching characteristics could be obtained by including in the spin torque oscillator a perpendicular free layer composed of a magnetic film having magnetic anisotropy axis in a direction perpendicular to a film surface and an in-plane free layer composed of a magnetic film effectively having a magnetization easy plane on the film surface, and applying almost constant electric currents from the in-plane free layer side to the perpendicular free layer side. Furthermore, it was learned that by making the perpendicular free layer thinner than the in-plane free layer, electric power saving and improved oscillatory frequencies could be expected and high areal recording density could be achieved. In addition, it was learned that the degree of freedom in designing would increase by placing the perpendicular free layer between the main pole and the in-plane free layer. As the STO of the present invention does not require the perpendicular free layer to be strongly fixed during oscillation, materials having relatively small perpendicular magnetic anisotropy can be used. In this case, use of a magnetic body with a small damping factor can reduce electric currents needed for oscillation and control any change of magnetism of materials/degradation of element characteristics due to electron migration and the like. On the other hand, since in-plane free layer magnetization nearly rotates in a plane, strong, stable high-frequency magnetic fields can be obtained. From the above, it was learned that in an information recording apparatus which applies microwave assisted recording with areal recording density exceeding 1 T bits per square inch, information transfer rate of over 2 Gbit/s could be realized.

In addition, the technology disclosed in Japanese Patent Application Publication No. 2008-277586 and Japanese Patent Application Publication No. 2008-305486 which rotates magnetization of equivalent two free layers divided by a non-magnetic layer in almost antiparallel combined state, and subjecting to radio-frequency linear oscillation in the plane magnetic fields which appear at the air bearing surface and lie between equivalent positive and negative magnetizations is irrelevant to the present invention in the following points: 1) a spin polarization layer (reference layer) is needed, 2) electric currents are applied from the reference layer side to FGL side (direction of electric currents is reverse to the STO of the present invention), 3) thickness of a pair of free rotating layers is almost equal, 4) no perpendicular magnetic anisotropy is given to the free rotating layers, and the like.

Specific embodiments of the present invention will be hereinafter described in detail.

Figure 17:
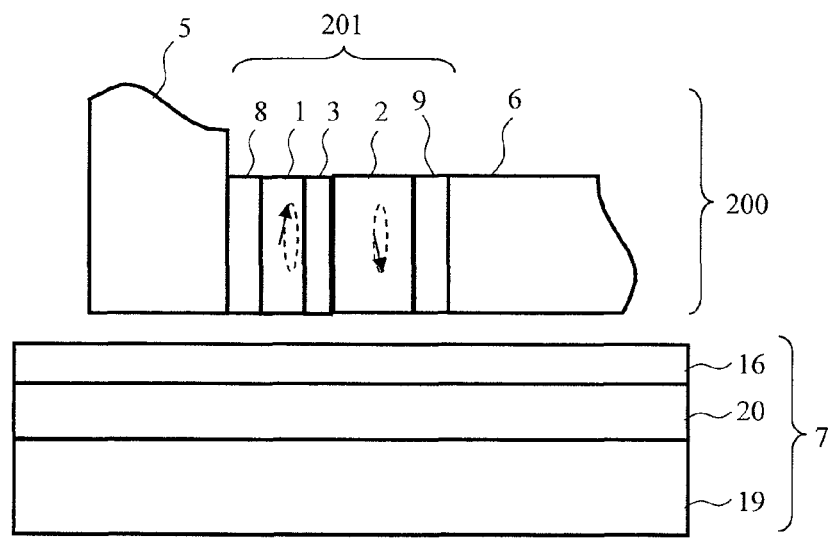
FIG. 17 is a schematic cross sectional view of a magnetic recording head of one embodiment of the present invention.

FIG. 17 is a cross sectional schematic diagram of a magnetic recording head of one embodiment of the present invention which is cut on a plane which is perpendicular (up-down direction in the figure) to a recording medium surface and parallel to a head running direction (track direction which is a left or right direction in the figure). The figure also shows a cross section of the medium.

A recording head 200 configures a magnetic circuit between a main pole 5 and a faced magnetic pole 6, in the upper part of the drawing. However, in the upper part of the drawing, it is nearly electrically insulated. The magnetic circuit is an open circuit formed by magnetic flux lines, and is not necessarily formed only by magnetic bodies. In addition, a magnetic circuit may be formed by arranging a auxiliary magnetic pole on the other side of the faced magnetic pole 6 of the main pole 5. In this case, the main pole 5 and the auxiliary magnetic pole need not be electrically isolated. Furthermore, a magnetic recording head 200 shall be provided with a coil for energizing the magnetic circuits, copper wire, and the like. An STO 201 of the present invention is formed between the main pole 5 and the faced magnetic pole 6. The main pole 5 and the faced magnetic pole 6 are provided with an electrode or a means for electrically being in touch with the electrode, and are such configured that STO drive currents flow through the in-plane free layer 2 from the main pole 5 side to the faced magnetic pole 6 side or vice versa. A CoFe alloy with large saturation magnetization and low crystalline magnetic anisotropy is used as material for the main pole 5 and the faced magnetic pole 6. In a recording medium 7, on a substrate 19 are used a laminated layer which forms as a underlayer 20 a 10 nm-Ru layer on 30 nm-CoFe, and a CoCrPt—SiOx layer with magnetic anisotropy field of 1.6 MA/m (20 kOe) and film thickness of 10 nm as a recording layer 16.

Adjacent to the main pole 5, an STO composed in layers of a non-magnetic spin scattering layer 8, a perpendicular free layer 1, a non-magnetic spin transfer layer 3, an in-plane free layer 2, and a second non-magnetic spin scattering layer 9 is formed, leading to the faced magnetic pole 6. In addition, the non-magnetic spin scattering layer 8 to the second non-magnetic spin scattering layer 9 are configured like a pillar extending from side to side on the drawing, and have a cross section shaped like a rectangle the side of which along an air bearing surface is long. As the rectangular shape results to shape anisotropy in a track width direction, it becomes possible to smoothly perform in-plane magnetization rotation of the in-plane free layer 2 even if there is any in-plane component of the in-plane free layer 2 of a leaking field from the min pole, and thus the main pole 5 and the in-plane free layer 2 can get closer. However, if there is a little leaking field from the main pole 5, there is no problem even if shape of the cross section is a square. Length w of the side along the air bearing surface of the cross section shape is an important factor to determine recording track width, and is 40 nm in the embodiment. In the microwave assisted recording, a recording medium with high magnetic anisotropy which enables recording only when a writemagnetic field from the main pole 5 matches high-frequency magnetic field from the perpendicular free layer 1 and the in-plane free layer 2 is used, width and thickness (length in the direction of head running) of the main pole 5 can be set larger so that a large writemagnetic field can be taken. In the embodiment, by setting width and thickness of the recoding medium to 80 m and 100 nm, a writemagnetic field of about 0.9M/m can be obtained.

A 5 nm-(Co/Ni9N multilayer was used for the perpendicular free layer 1. As length from an end face of the main pole 5 to that of the faced magnetic pole 6 is 40 nm, and height of the in-plane free layer 2 is 38 nm, a magnetic field to be applied to the STO of the present invention is about 0.8 mA/m (10 KOe) according to analysis by using 3D field simulator. The in-plane free layer 2 is a CoFe alloy being 15 nm thick which has large saturation magnetization and low crystalline magnetic anisotropy. In the in-plane free layer 2, magnetization rotates at a high speed in a plane along the layer, and a fringing field from the pole which appears at the air bearing surface and the lateral sides acts as a high-frequency magnetic field. For the in-plane free layer 2, a material with large saturation magnetization such as (Co/Fe)n multilayer and the like having negative perpendicular magnetic anisotropy may be used. In this case, in-plane rotation of the in-plane free layer magnetization is stabilized.

In the STO 201 of the embodiment, as the perpendicular free layer 1 lies between the main pole 5 and the in-plane free layer 2, STO drive currents need to be applied from the faced magnetic pole 6 side to the main pole 5 side to achieve spin torque oscillation in the AF-mode. In the case where magnetic flux flows from the main pole 5 side, a rotating direction of magnetization of the in-plane free layer 2 is anti-clockwise when viewed from the upstream side of the STO drive currents, and it is possible to apply a polarized field in the same direction as a precession direction of magnetization of a recording medium which is switched by a magnetic field from the main pole 5. In the case where a magnetic field flows into the main pole 5, the rotating direction of the magnetization of the in-plane free layer 2 is clockwise when viewed from the upstream side of STO drive currents, and it is possible to apply a polarized field in the same direction as a precession direction of magnetization of the recording medium which is switched by a magnetic field to the main pole 5. Therefore, the high-frequency magnetic field to be generated from the in-plane free layer 2 has the advantageous effect that it assists magnetization switching by the main pole 5, independent of polarity of the main pole 5. The advantageous effect cannot be achieved in the high-frequency magnetic field generator of Patent Document 1 in which a direction of spin torques does not vary depending on polarity of the main pole 5.

The spin torque action becomes larger as STO drive currents increase, and also becomes larger if a Co or CoFeB layer with large polarizability is inserted between the non-magnetic spin transfer layer 3 and an adjacent layer. A 2 nm-Cu was used for the non-magnetic spin transfer layer 3. A 3 nm-Ru was used for the non-magnetic spin scattering layers 8, 9. Similar action can be achieved if Pd or Pt is used. The non-magnetic spin scattering layers 8, 9 act to prevent any interaction of the STO with the main pole 5 or the faced magnetic pole 6 via spin torques. Without non-magnetic spin scattering layers 8, 9, oscillation of the STO may not be stabilized. In addition, in the simulations described so far or the embodiments of FIGS. 12 to 15, the non-magnetic spin transfer layer 3 or the non-magnetic spin scattering layers 8, 9 are not considered. It is believed, however, that since they are non-magnetic, they do not magnetically interact with the STO, and that since they are structures in the order of nanometers, they have almost no effect on high-frequency magnetic fields to be generated.

Figure 18:
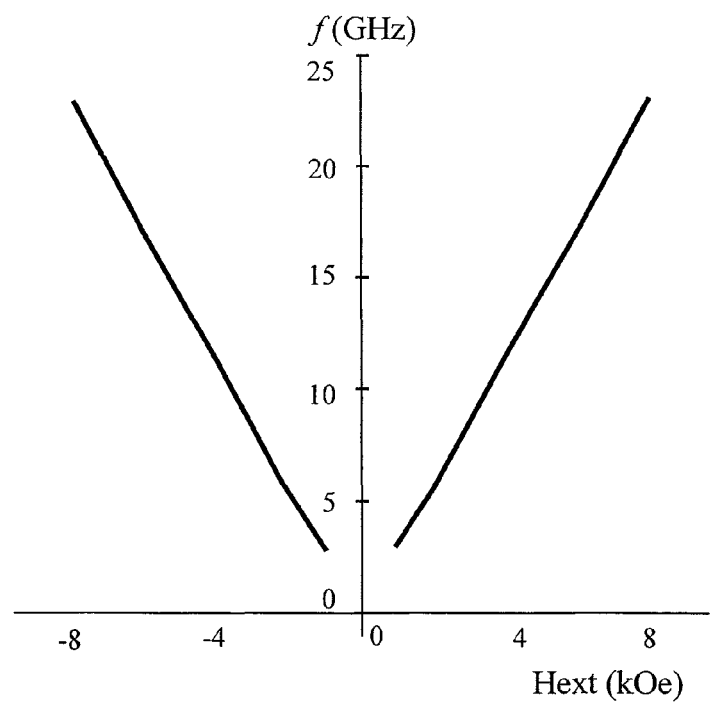
FIG. 18 is a view showing a relationship of an oscillatory frequency of only an STO and an external magnetic field.

FIG. 18 is a view showing results obtained by removing the main pole 5, the noon-magnetic spin scattering layers 8, 9 and the faced magnetic pole 6 from the prototype head shown in FIG. 17 and measuring a relationship of oscillatory frequency and an external magnetic field of the STO only. For a perpendicular free layer, a (Co/Pt)n multilayer being 40 nm×40 nm×5 nm and having $H_{kp}$=1280 kA/m (16 kOe) and $B_s$=1.2 T was used ($H_{kp}-H_{dp-eff}$=280 kA/m). In the AF-mode, it can be seen that oscillatory frequencies increase proportionally with an external terminal nearly applied. When film thickness of the perpendicular free layer is 10 m ($H_{kp}-H_{dp-eff}$=470 kA/m) and 15 nm ($H_{kp}-H_{dp-eff}$=650 kA/m), or it has high perpendicular magnetic anisotropy=1440 kA/m (18 kOe, $H_{kp}-H_{dp-eff}$=440 kA/m), oscillation did not occur. It is believed this is because a sufficient demagnetizing field could not be obtained. In addition, a (Co/Pd)n multilayer or a (Co/Pt)n multilayer was used for the perpendicular free layer, no oscillation occurred even if thickness tp was changed in the range from 5 nm to 15 nm. It is believed that this is because the perpendicular magnetic anisotropy was too high relative to the saturation magnetization and thus no sufficient demagnetizing field could be obtained even when the layer was thinned. Like the embodiment, if the STO which oscillates in the AF mode by applying a magnetic field without placing a magnetic body adjacent to the spin torque oscillator (STO) of the present invention, the need for the main pole 5, the non-magnetic spin scattering layers 8,9 and the faced magnetic pole 6 is eliminated.

Figure 19:
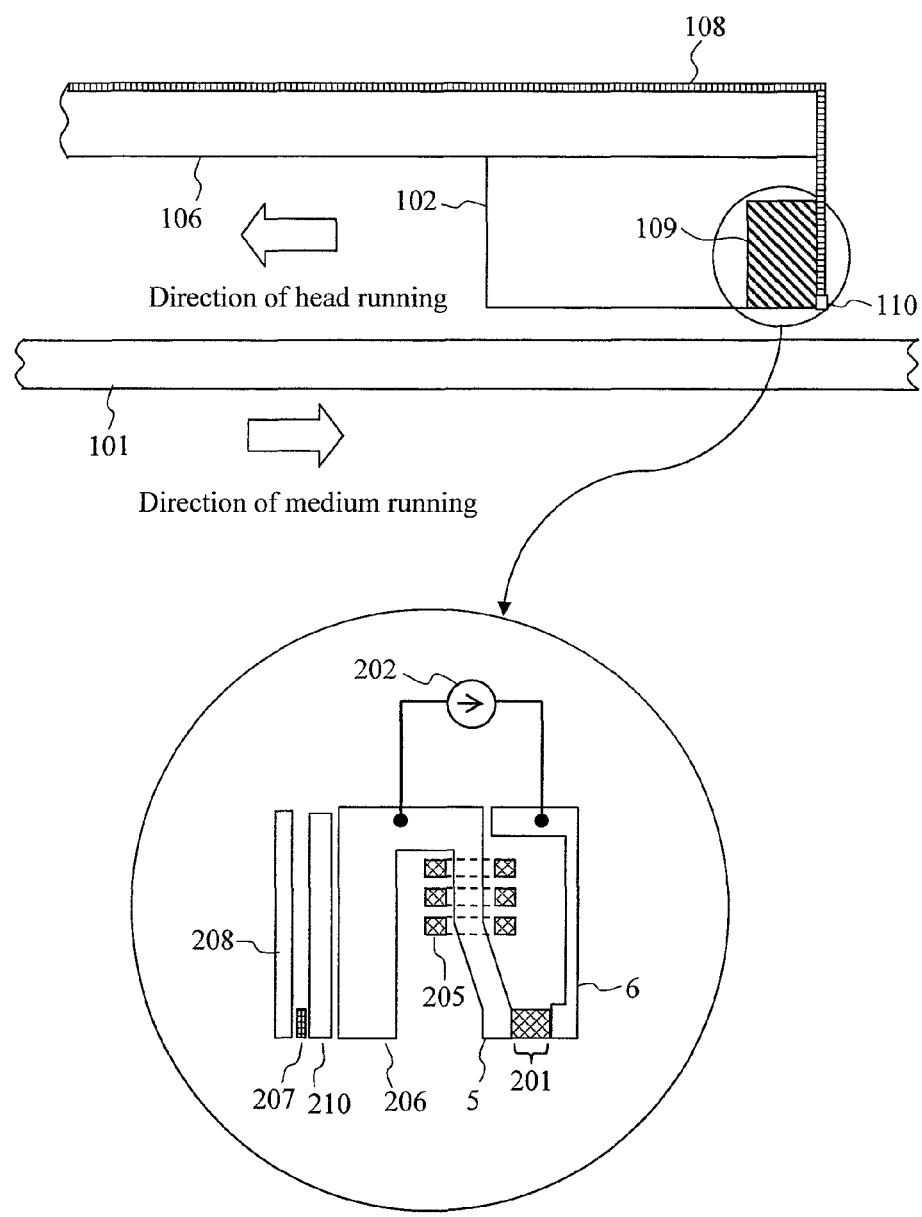
FIG. 19 is an expanded cross sectional view of a slider and a recording and reproducing section incorporated therein.

As shown in the schematic diagram of FIG. 19, recording and reproducing characteristics were examined by mounting to a suspension 106 a slider 102 incorporating a recording and reproducing section 109 into which the STO 201 of the present invention was built, and using a spinstand.

The recording and reproducing section 109 is comprised of a recording head section and a reader section. As shown in the expanded view in the figure, the recording head section is comprised of a auxiliary magnetic pole 206, the STO 201 arranged between the main pole 5 and the faced magnetic pole 6, a coil 205 for energizing the main pole and the like. The reader section is comprised of a sensor 207 arranged between a lower shield 208 and an upper shield 210 and the like. The auxiliary magnetic pole 206 and the upper shield 210 may be used in combination. Driving currents for each component of the recording and reproducing section 109 is fed by wiring 108, and supplied to each component by a terminal 110. Although in the expanded view, a power supply 202 for applying electricity to the STO 201 is schematically shown, in practice, the power supply 202 is placed outside the slider 102 and the STO drive currents by the power supply 202 are supplied to the STO 201 via the wiring 108.

Magnetic recording was performed with head-medium spacing of 20 m/s, magnetic spacing of 7 nm, and track pitch of 50 nm, and this was further reproduced by a GMR head with a shield gap of 15 nm. For a signal/noise ratio when a signal of 1300 kFCI was recorded at 512 MHz by changing STO drive voltage, a maximum of 13.1 dB was obtained when the STO drive voltage was 150 mV. In addition, the signal/noise ratio when a signal of 2600 kFCI was recorded at 1024 MHz was 8.0 dB at maximum. From this, it was learned that at the areal recording density exceeding 1 T bit per square inch, the information transfer rate of over 2 Gbit/s could be achieved. Then, frequency of the high-frequency magnetic field was 30 GHz. When an STO having the conventional structure which oscillates in T-mode and achieves comparable FGL (in-plane free layer) thickness and oscillatory frequency was used, almost equivalent result could be obtained when the head-medium spacing was 10 m/s. However, at 20 m/s, the signal/noise ratio when a signal of 2600 kFCI was recorded significantly degraded by 3.0 dB at maximum. For the STO having the conventional structure optimized for the T-mode oscillation, as the reference layer (perpendicular free layer) is thick and a demagnetizing field is inadequate and cannot be made to balance with the perpendicular magnetic anisotropy field, no AF-mode oscillation occurs.

Figure 20:
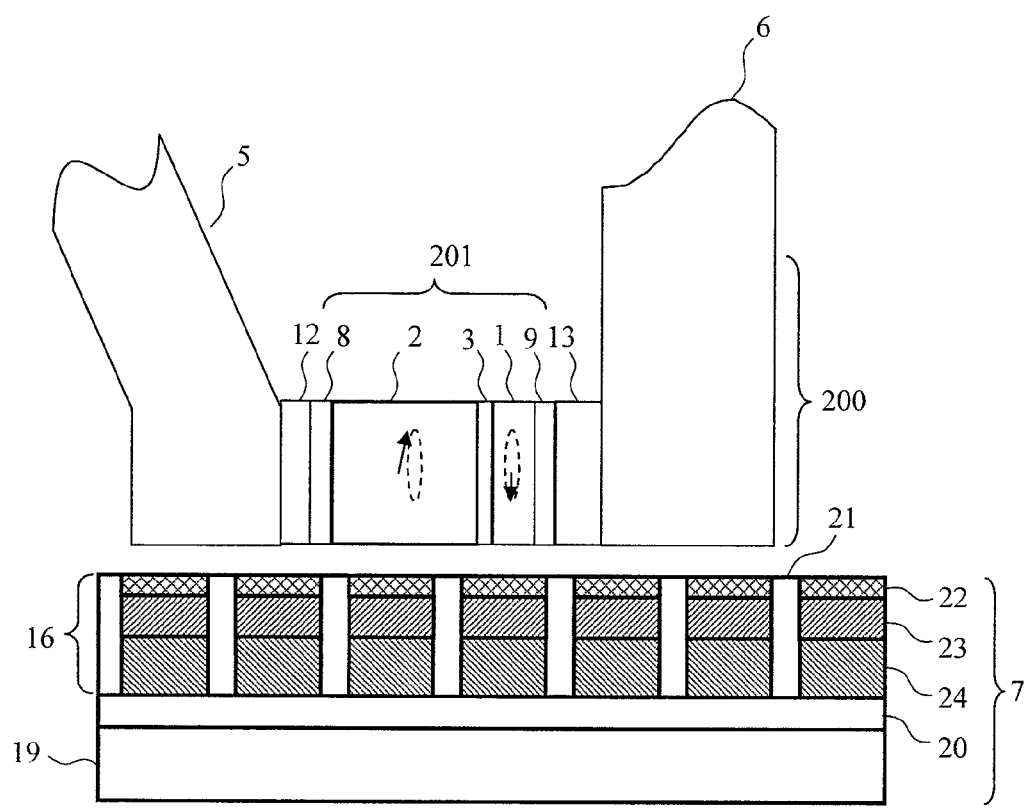
FIG. 20 is an expanded view of a magnetic head section.

FIG. 20 is a cross sectional schematic view in which a magnetic recording head having a main pole 5 which retreats from an STO of one embodiment of the present invention is cut on a plane on a plane which is perpendicular (up-down direction in the figure) to a recording medium surface and parallel to a direction of head running (track direction which is a left or right direction in the figure). The figure also shows a cross section of a medium. Magnetic field components entering an STO laminated layer surface from the main pole 5 can be reduced by retreating the main pole 5 from the STO, and reliable operation of the STO can be expected.

A recording head 200 configures a magnetic circuit between a main pole 5 and a faced magnetic pole 6, in the upper part of the drawing. However, in the upper part of the drawing, it is nearly electrically insulated. The magnetic circuit is an open circuit formed by magnetic flux lines, and is not necessarily formed only by magnetic bodies. In addition, a magnetic circuit may be formed by arranging a auxiliary magnetic pole on the other side of the faced magnetic pole 6 of the main pole 5. In this case, the main pole 5 and the auxiliary magnetic pole need not be electrically isolated. Furthermore, a magnetic recording head 200 shall be provided with a coil for energizing the magnetic circuits, copper wire, and the like. An STO 201 of the present invention is formed between the main pole 5 and the faced magnetic pole 6 via a main pole side field rectifying layer 12 and a faced magnetic pole field rectifying layer 13. The man pole field rectifying layer 12 and the faced magnetic pole field rectifying layer 13 are such designed that a magnetic field which is as strong as possible perpendicularly enters the laminated layer surface of the STO 201. In particular, the faced magnetic pole field rectifying layer 13 had better have a narrowed (a cross section on the faced magnetic pole 6 side is wider than that on the STO 201 side) structure. The main pole 5 and the faced magnetic pole 6 are provided with an electrode or a means for electrically being in touch with the electrode, and are such configured that STO drive currents flow through the in-plane free layer 2 from the main pole 5 side to the faced magnetic pole 6 side or vice versa. A CoFe alloy with large saturation magnetization and low crystalline magnetic anisotropy is used as material for the main pole 5, the main pole side field rectifying layer 12, the faced magnetic pole field rectifying layer 13, and the faced magnetic pole 6. In a recording medium 7, on a substrate 19 are used a laminated layer which forms as a underlayer 20 a 10 nm-Ru layer on 30 nm-CoFe, and a pattern medium having, as a recording layer 16, a 7 nm-recording layer 24, a 5 nm-transfer layer 23, a 3 nm-resonance layer 22 and being equivalent to 5 T bits per square inch (track pitch of 15 nm and bit pitch of 7 nm). The recording layer 24 is CoCrPt ($H_k$=2.4 MA/m), the transfer layer 23 is CoCrPt ($H_k$=2.0 MA/m), the resonance layer 22 is CoCrPt ($H_k$=1.6 MA/m), and SiOx is embedded in a bit gap 21.

Adjacent to the main pole 5 and the main pole side field rectifying layer 12, an STO composed in layers of a non-magnetic spin scattering layer 8, an in-plane free layer 2, a non-magnetic spin transfer layer 3, a perpendicular free layer 1, and a second non-magnetic spin scattering layer 9 is formed, leading to the faced magnetic pole 6 through the faced magnetic pole field rectifying layer 13. In addition, the non-magnetic spin scattering layer 8 to the second non-magnetic spin scattering layer 9 are configured like a pillar extending from side to side on the drawing, and have a cross section shaped like a square being 15 nm on a side. It may be a rectangular square having a cross sectional shape in which a direction along an air bearing surface is long. The microwave assisted recording uses a recording medium with such high magnetic anisotropy that recording is enabled only when a writemagnetic field from the main pole 5 matches a high-frequency magnetic field from the perpendicular free layer 1 and the in-plane free layer 2 is used, and therefore the width and thickness (length in the direction of head running) of the main pole 5 can be set large so that a large writemagnetic field can be taken. In the embodiment, by setting width and thickness of the recoding medium to 40 m and 70 nm, a writemagnetic field of about 0.7M/m can be obtained.

In the in-plane free layer 2, a 15-nm (Co/Fe)n multilayer of a magnetization easy plane type with large saturation magnetization and having negative perpendicular magnetic anisotropy is laminated. For the perpendicular free layer 1, 1.5-nm CoCr alloy ($H_{kp}$=480 kA/m, $B_s$=0.75 T) was used. A CoCrPt alloy may be used for the perpendicular free layer 1. As the CoCr alloy and the CoCrPt alloy have a damping factor which is about half of the (Co/Ni)n multilayer, they can reduce electric currents needed for oscillation and control any change of magnetism of materials/degradation of element characteristics due to electron migration and the like. If a thin Co layer is inserted between the in-plane free layer 2 and the non-magnetic spin transfer layer 3, the electric currents necessary for oscillation can be further reduced. As length from an end face of the main pole side field rectifying layer 12 to that of the faced magnetic pole field rectifying layer 13 is 25 nm, and height of the in-plane free layer 2 is 15 nm, a magnetic field to be applied to the STO of the present invention is about 1.2 mA/m (15 KOe) according to analysis by using 3D magnetic field analysis software. In the in-plane free layer 2, magnetization rotates at a high speed in a plane along the layer and a fringing field from the pole which appears at the air bearing surface and the lateral sides acts as a high-frequency magnetic field.

In the STO 201 of the embodiment, as the in-plane free layer 2 lies between the main pole 5 and the perpendicular free layer 1, STO drive currents need to be applied from the main pole 5 side to the faced magnetic pole 6 side to achieve spin torque oscillation in the AF-mode. When magnetic flux flows from the main pole 5 side, a rotating direction of magnetization of the in-plane free layer 2 is anti-clockwise when viewed from the upstream side of the STO drive currents, and application of a polarized field in the same direction as a precession direction of magnetization of a recording medium which switches with a magnetic field from the main pole 5 is possible. When a magnetic field flows into the main pole 5, the rotating direction of the magnetization of the in-plane free layer 2 is clockwise when viewed from the upstream side of STO drive currents, and application of a polarized field in the same direction as a precession direction of magnetization of the recording medium which switches with a magnetic field to the main pole 5 is possible. Therefore, the high-frequency magnetic field to be generated from the in-plane free layer 2 has the advantageous effect that it assists magnetization switching by the main pole 5, independent of polarity of the main pole 5. The advantageous effect cannot be achieved in the high-frequency magnetic field generator of Patent Document 1 in which a direction of spin torques does not vary depending on polarity of the main pole 5.

As shown in the schematic diagram of FIG. 19, recording and reproducing characteristics were examined by mounting to a suspension 106 a slider 102 incorporating a recording and reproducing section 109 into which the STO 201 of the present invention was built, and using a spinstand. Magnetic recording was performed with a head-medium spacing of 20 m/s, a magnetic spacing of 6 nm, and track pitch of 15 nm, and further reproduced by a GMR head with a shield gap of 13 nm. For a signal/noise ratio when a signal of 1815 kFCI was recorded at 714 MHz by changing STO drive voltage, a maximum of 14.2 dB was obtained when the STO drive voltage was 80 mV. In addition, the signal/noise ratio when a signal of 3630 kFCI was recorded at 1428 MHz was 8.5 dB at maximum. From this, it was learned that at the areal recording density exceeding 5 T bits per square inch, the information transfer rate of over 2 Gbit/s could be achieved. Then, frequency of the high-frequency magnetic field was 40 GHz. When the CoFe alloy was used for the in-plane free layer 2, sufficient signal/noise ratio could not be obtained. Since the in-plane free layer 2 in the embodiment was a cube, introduction of negative perpendicular magnetic anisotropy for inducing in-plane magnetization rotation was needed.

Figure 21A:
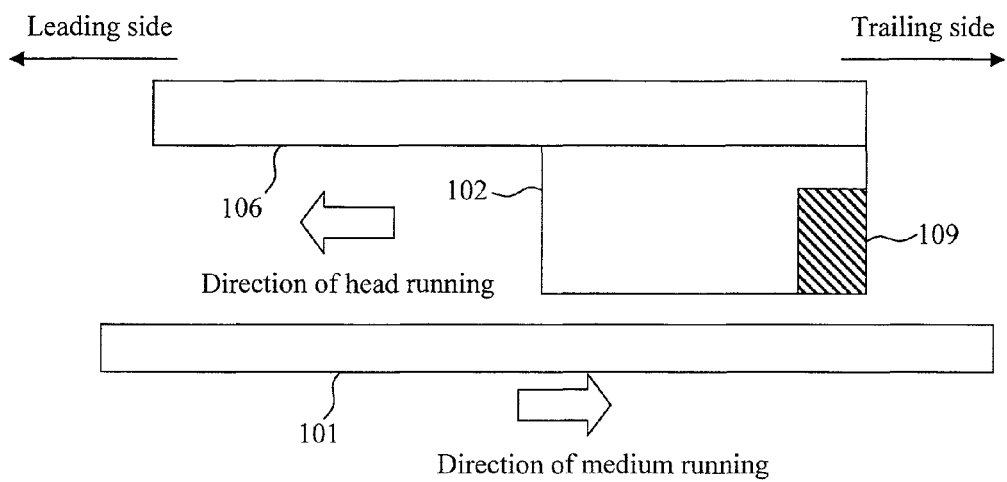
FIG. 21A is a view showing a configuration example of a slider and a magnetic head.
Figure 21B:
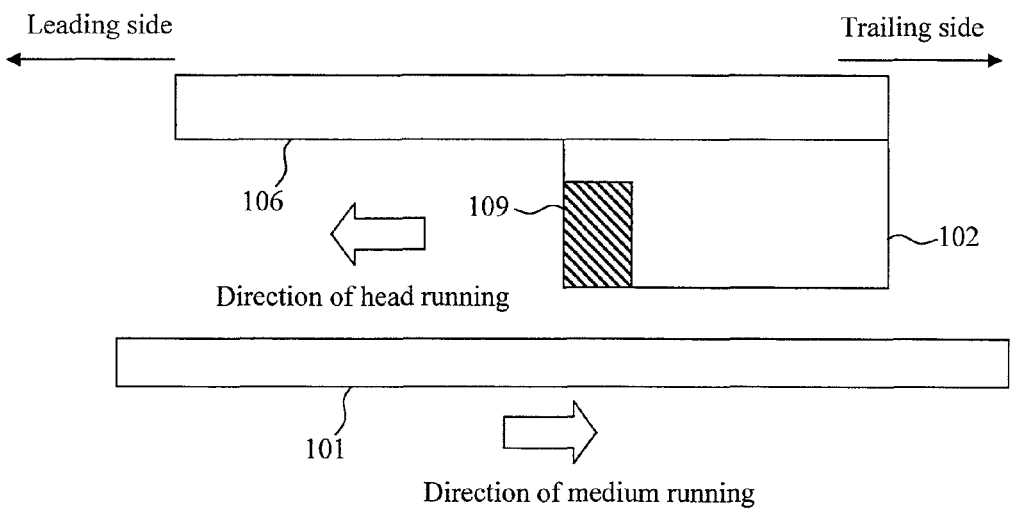
FIG. 21B is a view showing a configuration example of a slider and a magnetic head.

Using FIGS. 21A and 21B, an arrangement relationship of a direction of magnetic head running and a recording medium will be described. There are 2 styles of placing a magnetic head onto a slider: one is arrangement on the trailing side as shown in FIG. 21A, and another is arrangement on the leading side as shown in FIG. 21B. Here, the trailing side and the leading side are determined by a relative travel direction of the slider to the recording medium. If the rotating direction of the recording medium is switched to the direction shown, FIG. 21A shows placement on the leading side and FIG. 21B shows placement on the trailing side. In addition, although the relationship of the trailing side and the leading side can be switched, in principle, by switching polarity of a spindle motor and rotating the recording medium reversely, the switching of polarity of the spindle motor is unrealistic as the number of revolutions needs to be controlled accurately. If a microwave assisted recording head using (Co/Ni)n was used for the perpendicular free layer of the present invention, the signal/noise ratio and over-write properties sufficient for recording and reproduction of areal recording density exceeding 1 T bit per square inch could be achieved, whichever placement of FIG. 21A and FIG. 21B was used.

Figure 22A:
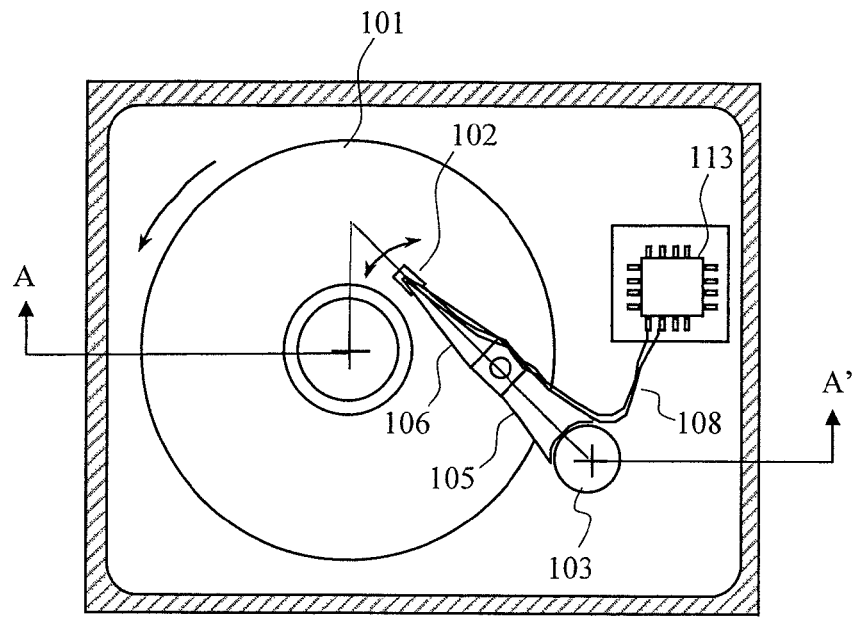
FIG. 22A is an upper surface schematic view of a magnetic recording apparatus.
Figure 22B:
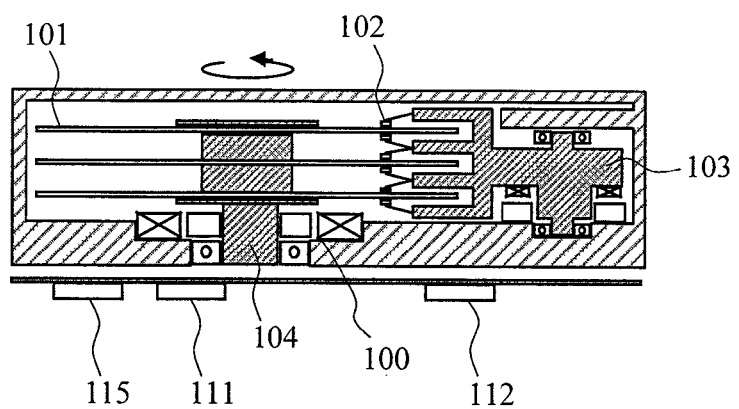
FIG. 22B is a cross sectional view of A-A' of FIG. 22A.

FIGS. 22A and 22B are schematic diagrams showing an overall configuration of a magnetic recording apparatus according to the present invention. FIG. 22A is a top view and FIG. 22B is an A-A' cross sectional view thereof. A recording medium 101 is fixed to a rotation bearing 104, and rotated by a motor 100. Although FIG. 22 shows an example in which 3 magnetic disks and 6 magnetic heads are incorporated, he magnetic disk may be 1 or more, and the magnetic head may be 1 or more. The recording medium 101 is shaped like a disk, and a recording layer is formed on both sides thereof. A slider 102 moves in almost radial direction on a rotating recording medium surface and has a recording and reproducing section on the end. The recording and reproducing section has a structure as shown in FIG. 19, for example, and a man pole and the STO of the present invention are provided in the recording section.

A suspension arm 106 is supported by a rotary actuator 103 via an arm 105. The suspension 106 has a function to press the slider 102 onto the recording medium 101 with predetermined load or separate it. Electric currents for driving each component of the magnetic head are supplied from an IC amplifier 113 via wiring 108. Processing of a recording signal to be supplied to the recording head section or a read signal to be detected from the reader is performed by a read/write channel IC 112 as shown in FIG. 22B. In addition, a control operation of the entire magnetic recording apparatus is implemented by a processor 110 executing a disk control program stored in a memory 111. Therefore, in the embodiment, a processor 115 and the memory 111 comprise a so-called disk controller.

When the recording head and the recording medium ((Co/Ni)n multilayer perpendicular free layer STO and CoCrPt—SiOx medium and CoCr alloy perpendicular free layer STO and bit pattern medium) described above were incorporated in a magnetic disk apparatus (recording on each surface of two 2.5-inch magnetic disks) shown in FIG. 22 and performance evaluation was conducted, an information recording and reproducing apparatus which utilized radio-frequency polarized fields having the information transfer rate of 2.0 Gbit/s with recording capacity of 2 T bytes (1 T bit per square inch) and the information transfer rate of 2.8 Gbit/s with the recoding capacity of 10 T bytes (5 T bits per square inch), respectively, was achieved. A combination of the recording head and the recording medium is not limited to the embodiment and the recording head of the present invention may be combined with other recording media. If a single drive and a (shingled-write) recording system are used in combination, a higher-capacity information recording and reproducing apparatus can be achieved. In addition, a recording head incorporating a CoCr alloy perpendicular free layer STO can reduce consumed power.

In addition, the present invention shall not be limited to the embodiments described above and includes various examples of modifications. For example, the embodiments described above have been explained in detail so as to make the present invention easily understood, and shall not be necessarily limited to those including all configurations described above. In addition, a configuration of other embodiment can be added to configuration of one embodiment. In addition, other configuration can be added/deleted/replaced for a part of configuration of each embodiment.

| Explanation of Reference Numerals | |
|---|---|
| 1 | perpendicular free layer |
| 2 | in-plane free layer |
| 3 | non-magnetic spin transfer layer |
| 5 | main pole |
| 6 | faced magnetic pole |
| 7 | magnetic recording medium |
| 8, 9 | non-magnetic spin scattering layer |
| 12 | main pole side field rectifying layer |
| 13 | faced magnetic pole field rectifying layer |
| 16 | recording layer |
| 19 | substrate |
| 20 | underlayer |
| 21 | bit gap |
| 22 | resonance layer |
| 23 | transfer layer |
| 24 | recording layer |
| 31 | reference layer |
| 32 | FGL |
| 100 | motor |
| 101 | recording medium |
| 102 | slider |
| 103 | rotary actuator |
| 104 | rotation bearing |
| 105 | arm |
| 106 | suspension |
| 108 | wiring |
| 109 | recording and reproducing section |
| 110 | terminal |
| 111. | memory |
| 112 | channel IC |
| 113 | IC amplifier |
| 115 | processor |
| 200 | recording head |
| 201 | STO |
| 202 | power supply |
| 205 | coil |
| 206 | auxiliary magnetic pole |
| 207 | sensor |
| 208 | lower shield |
| 210 | upper shield |

What is claimed is:

1. A magnetic recording head comprising:
a main pole; and
a spin torque oscillator arranged in the vicinity of the main pole, wherein
the magnetic recording head records information by switching magnetization of a magnetic recording medium with a switching field generated by the main pole and a high-frequency magnetic field generated by the spin torque oscillator,
the spin torque oscillator includes a perpendicular free layer formed of a magnetic film having a magnetic anisotropy axis in a direction perpendicular to a film surface, magnetization of the perpendicular free layer being rotatable, and an in-plane free layer formed of a magnetic film effectively having a magnetization easy plane on a film surface, magnetization of the in-plane free layer being rotatable, and
an electric current flows from an in-plane free layer side to a perpendicular free layer side in the spin torque oscillator;
a non-magnetic layer is provided between the perpendicular free layer and the in-plane free layer.

2. The magnetic recording head according to claim 1, wherein the perpendicular free layer has a thinner film thickness than the in-plane free layer.

3. The magnetic recording head according to claim 1, wherein a magnetic anisotropy field of the perpendicular free layer attributable to a material and an effective demagnetizing field in a direction perpendicular to the film surface of the perpendicular free layer have magnitudes nearly balanced in reverse directions.

4. The magnetic recording head according to claim 1, wherein the perpendicular free layer is placed between the main pole and the in-plane free layer.

5. The magnetic recording head according to claim 1, wherein, with respect to the in-plane free layer, a value obtained by subtracting an effective demagnetizing field from a perpendicular magnetic anisotropy field resulting from a material of the in-plane free layer is less than −200 kA/m.

6. The magnetic recording head according to claim 1, wherein the in-plane free layer comprises a material having negative perpendicular magnetic anisotropy.

7. The magnetic recording head according to claim 1, wherein the in-plane free layer comprises one of a CoIr alloy, a CoFeIr alloy, and a (Co/Fe)n multilayer.

8. The magnetic recording head according to claim 1 having an information transfer rate exceeding 2 Gbits/s.

9. A magnetic recording apparatus comprising:
a magnetic recording medium;
a medium driving section for driving the magnetic recording medium;
a magnetic head for performing recording and reproducing operations on the magnetic recording medium; and
a head driving section for positioning the magnetic head above a desired track of the magnetic recording medium, wherein
the magnetic head includes a recording head and a reader,
the recording head includes a main pole and a spin torque oscillator arranged in the vicinity of the main pole,
the recording head records information by switching magnetization of the magnetic recording medium with a switching field generated by the main pole and a high-frequency magnetic field generated by the spin torque oscillator,
the spin torque oscillator includes a perpendicular free layer formed of a magnetic film having a magnetic anisotropy axis perpendicular to a film surface, magnetization of the perpendicular free layer being rotatable, and an in-plane free layer formed of a magnetic film effectively having a magnetization easy plane on a film surface, magnetization of the in-plane free layer being rotatable, and
an electric current flows from an in-plane free layer side to a perpendicular free layer side in the spin torque oscillator;
a non-magnetic layer is provided between the perpendicular free layer and the in-plane free layer.

10. The magnetic recording apparatus according to claim 9, wherein the perpendicular free layer has a thinner film thickness than the in-plane free layer.

11. The magnetic recording apparatus according to claim 9, wherein a magnetic anisotropy field of the perpendicular free layer attributable to a material and an effective demagnetizing field in a direction perpendicular to the film surface of the perpendicular free layer have magnitudes nearly balanced in reverse directions.

12. The magnetic recording apparatus according to claim 9, wherein the perpendicular free layer is placed between the main pole and the in-plane free layer.

* * * * *